US011985741B2

(12) United States Patent
Upton et al.

(10) Patent No.: US 11,985,741 B2
(45) Date of Patent: May 14, 2024

(54) HUMAN-CENTRIC LIGHTING CONTROLLER

(71) Applicant: Mate. LLC, Oklahoma City, OK (US)

(72) Inventors: Jon Daniel Upton, Oklahoma City, OK (US); Jennifer Upton, Oklahoma City, OK (US); Christian Ratcliffe, Tuttle, OK (US); Brandon E. Lambert, Oklahoma City, OK (US); John Christopher Gowin, Oklahoma City, OK (US); Elton Lee Ledbetter, Moore, OK (US); Christopher Andrew Merts, Blanchard, OK (US)

( * ) Notice: Subject to any disclaimer, the term of this patent is extended or adjusted under 35 U.S.C. 154(b) by 144 days.

(21) Appl. No.: 17/745,602

(22) Filed: May 16, 2022

(65) Prior Publication Data

US 2022/0279634 A1 Sep. 1, 2022

Related U.S. Application Data

(63) Continuation-in-part of application No. 17/302,973, filed on May 17, 2021.

(60) Provisional application No. 63/026,304, filed on May 18, 2020.

(51) Int. Cl.
*H05B 45/20* (2020.01)
*H05B 47/16* (2020.01)

(52) U.S. Cl.
CPC ............ *H05B 45/20* (2020.01); *H05B 47/16* (2020.01)

(58) Field of Classification Search
None
See application file for complete search history.

(56) References Cited

U.S. PATENT DOCUMENTS

| | | | |
|---|---|---|---|
| 7,348,949 | B2 | 3/2008 | Lee et al. |
| 7,687,753 | B2 | 3/2010 | Ashdown |
| 8,299,987 | B2 | 10/2012 | Neudorf et al. |
| 8,330,373 | B2 | 12/2012 | Ramer et al. |
| 8,337,031 | B2 | 12/2012 | Wegh et al. |
| 8,517,550 | B2 | 8/2013 | Ramer et al. |
| 8,525,446 | B2 | 9/2013 | Tikkanen et al. |

(Continued)

FOREIGN PATENT DOCUMENTS

| | | | |
|---|---|---|---|
| CA | 2913239 | A1 | 12/2014 |
| WO | 2010031169 | A1 | 3/2010 |

(Continued)

*Primary Examiner* — Dedei K Hammond

(74) *Attorney, Agent, or Firm* — Young's Patent Services; Bruce A. Young

(57) ABSTRACT

A correlated color temperature (CCT) of one or more luminaires is controlled by obtaining a target CCT for the one or more luminaires and obtaining a first profile associated with a first luminaire of the one or more luminaires. A first target power for a first direct-current (DC) power input of the first luminaire and a second target power for a second DC power input of the first luminaire are calculated based on the target CCT and the first profile so that the first target power and the second target power drive the first luminaire to emit light at the target CCT. A first DC power supply is controlled to deliver the first target power to the first DC power input of the first luminaire and a second DC power supply is controlled to deliver the second target power to the second DC power input of the first luminaire.

36 Claims, 16 Drawing Sheets

(56) References Cited

U.S. PATENT DOCUMENTS

| | | | |
|---|---|---|---|
| 8,866,414 B2 | 10/2014 | Maxik et al. | |
| 8,926,133 B2 | 1/2015 | Booth | |
| 8,957,601 B2 | 2/2015 | Tikkanen et al. | |
| 9,039,230 B2 | 5/2015 | Crimi et al. | |
| 9,041,379 B2 | 5/2015 | Fyons | |
| 9,049,759 B2 | 6/2015 | Tikkanen et al. | |
| 9,055,622 B2 | 6/2015 | Aldrich et al. | |
| 9,078,310 B2 | 7/2015 | Tikkanen et al. | |
| 9,320,093 B2 | 4/2016 | Tikkanen et al. | |
| 9,410,664 B2 | 8/2016 | Krames et al. | |
| 9,433,053 B2 | 8/2016 | Neudorf | |
| 9,591,713 B2 | 3/2017 | Tikkanen et al. | |
| 9,662,409 B2 | 5/2017 | Rains, Jr. et al. | |
| 9,775,207 B2 | 9/2017 | Tikkanen et al. | |
| 9,942,954 B2 | 4/2018 | Neudorf et al. | |
| 10,045,421 B2 | 8/2018 | Tikkanen et al. | |
| 10,076,016 B2 | 9/2018 | Tikkanen et al. | |
| 10,187,946 B2 | 1/2019 | Tikkanen et al. | |
| 10,237,945 B2 | 3/2019 | Sooch et al. | |
| 10,299,441 B2 | 5/2019 | Elmpt et al. | |
| 10,362,655 B2 | 7/2019 | Heim et al. | |
| 10,368,811 B1 | 8/2019 | Bajaj et al. | |
| 10,582,596 B2 | 3/2020 | Sooch et al. | |
| 10,621,836 B2 * | 4/2020 | Sooch | H05B 45/20 |
| 10,757,791 B1 | 8/2020 | Jonsson | |
| 2006/0125770 A1 | 6/2006 | Kao et al. | |
| 2008/0251690 A1 | 10/2008 | Keiper et al. | |
| 2011/0204820 A1 | 8/2011 | Tikkanen et al. | |
| 2012/0119658 A1 | 5/2012 | McDaniel | |
| 2013/0093362 A1 | 4/2013 | Edwards | |
| 2013/0218030 A1 | 8/2013 | Barroso et al. | |
| 2016/0128144 A1 | 5/2016 | Tikkanen et al. | |
| 2016/0158486 A1 | 6/2016 | Colbaugh et al. | |
| 2016/0227616 A1 * | 8/2016 | Lee | H05B 47/105 |
| 2017/0025028 A1 | 1/2017 | Hrushesky | |
| 2017/0105265 A1 | 4/2017 | Sadwick | |
| 2017/0127497 A1 | 5/2017 | Baek et al. | |
| 2017/0132946 A1 | 5/2017 | Kinnunen et al. | |
| 2017/0332462 A1 | 11/2017 | Tikkanen | |
| 2018/0318602 A1 | 11/2018 | Ciccarelli et al. | |
| 2019/0183415 A1 | 6/2019 | Rytky et al. | |
| 2019/0216391 A1 | 7/2019 | Kenyon et al. | |
| 2019/0279482 A1 | 9/2019 | Kaplan et al. | |
| 2020/0068680 A1 | 2/2020 | Neudorf et al. | |

FOREIGN PATENT DOCUMENTS

| | | |
|---|---|---|
| WO | 2016067028 A2 | 5/2016 |
| WO | 2018220087 A1 | 12/2018 |
| WO | 2019141904 A1 | 7/2019 |
| WO | 2020082178 A1 | 4/2020 |

* cited by examiner

HUMAN-CENTRIC LIGHTING CONTROLLER

CROSS-REFERENCE TO RELATED APPLICATIONS

This application is a continuation-in-part of U.S. patent application Ser. No. 17/302,973, filed on May 17, 2021, and entitled "CENTRALLY-CONTROLLED TUNABLE LIGHTING," which claims the benefit of U.S. Provisional Application 63/026,304 filed May 18, 2020, and entitled "CENTRALLY CONTROLLED SYSTEMS AND METHODS FOR DIRECT-CURRENT TUNABLE LIGHTING," both of which are hereby incorporated by reference in their entirety herein for any and all purposes.

TECHNICAL FIELD

The present subject matter relates to centrally-controlled tunable lighting. More particularly the disclosure relates to central control of direct-current (DC) tunable solid-state lighting systems configured to set indoor lighting for particular times of the solar day.

BACKGROUND

Light sources may be classified by the color appearance of the light wavelengths they produce, which may be referred to as the correlated color temperature (or simply, color temperature) of the light wavelengths. The correlated color temperature (CCT) is a measure of how "cool" or "warm" the light wavelengths appear to the human eye and may be measured in degrees Kelvin (K, a unit of thermodynamic temperature, equal in magnitude to a degree Celsius but starting at absolute zero) or in micro reciprocal degrees. A "micro reciprocal degree", commonly referred to as a mired (M), is a unit of measurement used to express color temperature based on the following formula: M=1,000,000/(Color Temperature in Kelvins), so 100 M=10000K, 200 M=5000K, 300 M=3333K, 400 M=2500K, and 500 M=2000K. Note that because there is a direct reciprocal relationship between K and M, either one can be used interchangeable to describe a light source.

The CCT of a light source may be technically defined as the temperature of an ideal black-body radiator that radiates light of a color comparable to that of the light source. Typically, the cooler the light wavelengths appear, the higher the CCT or the lower the mired value. The warmer the light wavelengths appear, the lower the CCT or a higher mired value.

As the sun appears to move across the sky, the CCT of sunlight reaching a person on the Earth changes incrementally from a warm orange light at sunrise to a cool blue light at solar noon and back to a warm orange light at sunset. The time of day of these events changes depending on the day of the year and the location of the observer on the Earth. For example, on Mar. 25, 2020, the sunrise in Oklahoma City, Oklahoma, USA was at 7:25 AM. Central Daylight Savings Time (CDT), solar noon occurred at 1:36 PM. CDT, and the sunset was at 7:47 PM. CDT. As an example of the change in time of these events based on the day, on Apr. 13, 2020, the first light in Oklahoma City, Oklahoma, USA, was at 6:31 AM. CDT, sunrise was at 6:58 AM CDT, solar noon occurred at 1:30 PM CDT, and the sunset was at 8:02 PM CDT. This information can be determined for every day based on calculation of the position of the sun and the Earth. The information may also be retrieved from one or more pre-calculated databases.

The changing CCT of daylight affects human circadian rhythms. The circadian system in animals and humans is near, but not exactly, 24-hours in cycle length, and must be reset daily to remain synchronized with external environmental time, a process known as entrainment. Entrainment is achieved in most mammals through regular exposure to contrast between light color and darkness.

Circadian rhythms control the sleep-wake cycle, affect alertness, and affect quality of sleep, among other physiological and behavioral factors. Exposure to light having a CCT differing from that of current daylight can have a negative impact on circadian rhythm, including changing the timing of the sleep-wake cycle, periods of alertness, and/or periods of drowsiness, for example. Further, exposure to certain wavelengths of light may be beneficial during daylight hours because the wavelengths may boost attention, reaction times, and mood, but may be detrimental and disruptive to sleep at night. Exposure of people to light at night can shift circadian rhythms and suppress the secretion of melatonin. Further, research shows that unbalanced circadian rhythms with shortened or disrupted sleep cycles may contribute to the causation of disease, by lessoning the time for the body to heal itself.

Currently, most common commercially available artificial light sources emit light having a fixed CCT, are rated to output a set brightness in lumens, and to use a particular amount of power in Watts (W). For example, a light fixture (or luminaire) may have a light emitting diode (LED) that produces light at 2700 K (a warm, or orangish color), at a light output of 1550 lumens, and be rated to use 18 W of power when connected to an alternating current (AC) 120 V power source. However, a single-color light output greatly limits the lighting effects that can be accomplished and does not match the changing colors of daylight from the sun.

Some "smart" single-point lighting fixtures are available that include multiple light emitting diodes that have different colors of light output and a computer chip within the fixture that can control which LEDs receive power, and therefore, which LEDs produce light. Typically, these smart single-point lighting fixtures must be programmed individually. This individual programming, when multiplied across all smart single-point lighting fixtures in a structure (sometimes hundreds of fixtures), requires a significant amount of time and knowledge. Some smart single-point lighting fixtures may be programmed using a wireless retrofit connection, in that the smart single-point lighting fixtures are used in electrical sockets wired for AC and have wireless capability within the smart single-point lighting fixtures such that they can be programmed remotely, or remotely as a set of fixtures. However, a computer chip is still required within each individual smart single-point lighting fixture.

Additionally, each of the smart single-point lighting fixtures is electrically connected to an AC electrical power source. The AC power is converted to direct current (DC) power to drive the actual LEDs which results in excess heat that must be dissipated by the lighting fixture and can result in the premature failure of the smart single-point lighting fixture caused by failure of the computer chip through exposure to the heat. Often the computer chip fails in this way well before the LEDs fail. For example, the computer chip may fail while the LEDs still have one third to one half of its predicted life. Further, because of requirements for AC to DC electrical power conversion to power the smart single-point lighting fixtures, the smart single-point lighting fixtures are power inefficient up to 70% and thus multiple breakers may be required in an electrical panel to contain all of the electrical wiring for a building having smart single-point lighting fixtures. Also, the use of AC electrical power means that the amount of, or variation in, power delivered to the LEDs must be controlled at the fixture itself, not from a central location.

Systems also currently exist to control lighting systems from a DMX controller board, which is a computer circuit board or computer processor programmed in compliance with the Digital Multiplex (DMX) standard for digital communication networks, which is entitled "Entertainment Technology—USITT DMX512-A—Asynchronous Serial Digital Data Transmission Standard for Controlling Lighting Equipment and Accessories." The standard was originally developed in 1986 with the most recent revision approved by the American National Standards Institute (ANSI) in 2008 ("E1.11-2008, USITT DMX512-A"), but will be referred to herein as DMX, and it is understood that future revisions are contemplated. And while DMX may allow for sending control information to lighting fixtures, it does not address providing power, and thus many of the issues related to AC-powered single-point lighting fixtures, such as excess heat generation, may still be present in lighting systems using DMX.

For example, a DMX controller board may be used to control up to 512 functions (referred to as "channels") on a single network bus wired to an output connection of the DMX controller board. Each lighting fixture may include multiple functions (i.e., channels). For example, a lighting fixture including three light emitting diodes, each having a different color output, may have three channels (that is, one for each light emitting diode).

Traditionally, programming lighting systems using DMX has been complicated, difficult, and time-consuming since the devices are programmed at the DMX controller board and/or at the light fixtures. The programming may be done in an analog manner (typically using a series of switches and buttons) or remotely. Such programming is usually done by audio-visual technicians having specific training in such systems. The programming is typically done after an electrician has installed the lighting fixtures and so also requires additional personnel and time.

In addition, current lighting systems are programmed without regard for, and without using or considering, external data factors. For example, a smart single-point fixture may be set for a cool-light output starting at six in the morning, without regard to actual external daylight conditions. As another example, a series of lighting fixture effects may be programmed with no consideration to matching external sunlight changes. Additionally, traditional user interfaces require programming languages that have been complex and difficult for installers, such as trade electricians, to learn and to implement. Often, only specially trained installers are able to navigate the traditional programming interfaces.

BRIEF DESCRIPTION OF THE DRAWINGS

The accompanying drawings, which are incorporated in and constitute part of the specification, illustrate various embodiments. Together with the general description, the drawings serve to explain various principles. In the drawings.

DETAILED DESCRIPTION

Figure 1A:
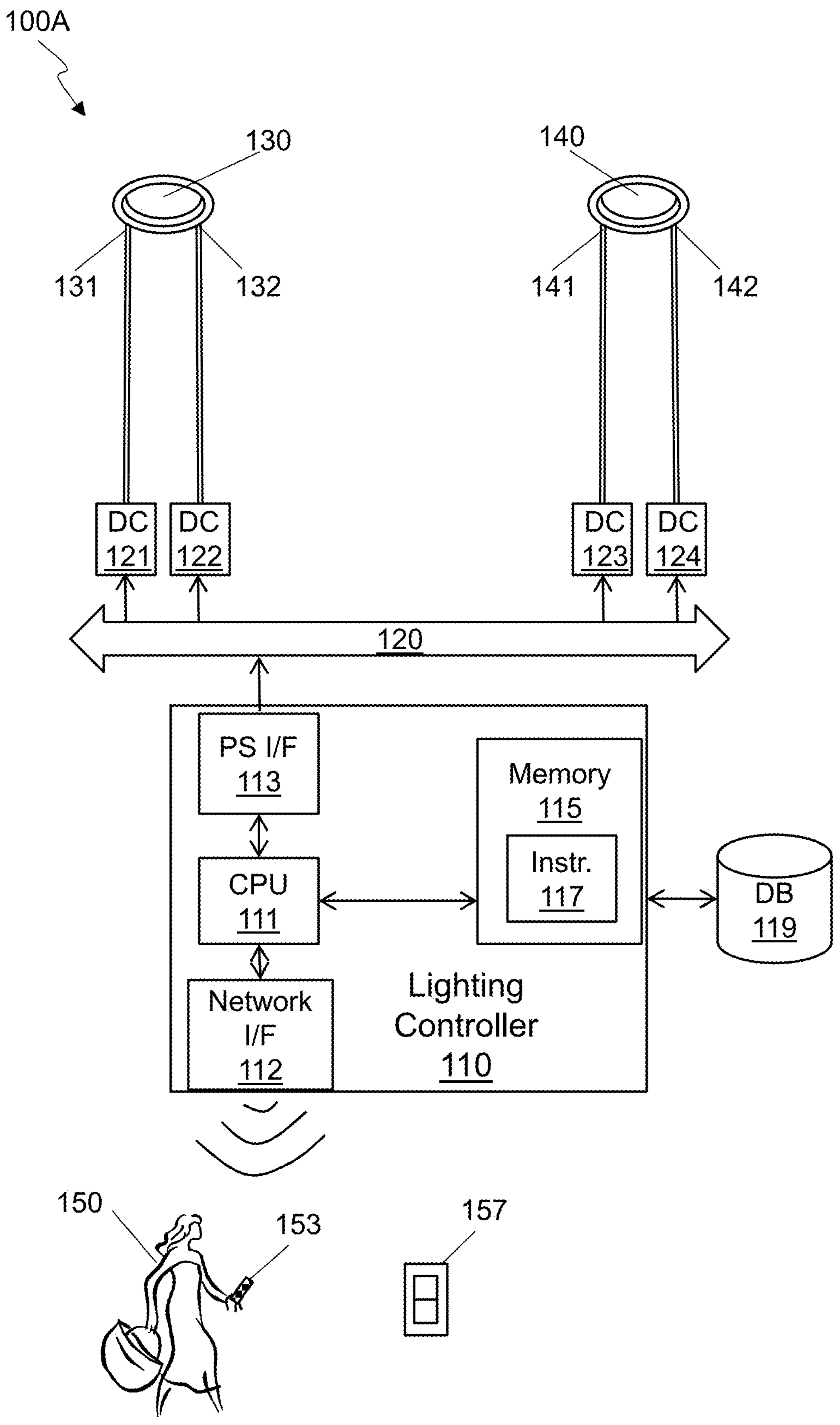
FIG. 1A shows a block diagram of an embodiment of a lighting system.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, and components have been described at a relatively high-level, without detail, in order to avoid unnecessarily obscuring aspects of the present concepts. A number of descriptive terms and phrases are used in describing the various embodiments of this disclosure. These descriptive terms and phrases are used to convey a generally agreed upon meaning to those skilled in the art unless a different definition is given in this specification. Some descriptive terms and phrases are presented in the following paragraphs for clarity.

A solar event refers to a time, or range of times, that is based on a position of the sun (i.e. a solar position) at a particular location. Examples of solar events, include early morning, sunrise, mid-morning, solar noon, afternoon, sunset, evening, astronomical dawn, astronomical twilight, astronomical dusk, nautical dawn, nautical twilight, nautical dusk, civil dawn, civil twilight, civil dusk, night, and daylight. Other solar events may be defined in some embodiments.

The solar event "early morning" may be defined as a predetermined time period from a time before sunrise up until sunrise. In one embodiment, early morning may be, for example, a twilight period of time in which sunlight reaches the earth but before sunrise at a geographic location. In one embodiment, early morning may be a chosen artificial twilight period of time, such as, for example, a time period for which a user is awake before sunrise, or a predefined time set by the user.

The solar event "sunrise" may be defined as the time at which the upper edge of the sun becomes visible over the eastern horizon in the morning at a geographic location on a particular date. In one embodiment, sunrise may be defined as a range of time on either side of a moment of sunrise.

The solar event "mid-morning" may be defined as a predetermined time period starting after sunrise and lasting until solar noon at a geographic location on a particular date. In one embodiment, mid-morning may begin at a mid-point between the time of sunrise and the time of solar noon.

The solar event "solar noon" may be defined as the time when the sun passes the meridian of a geographic location and reaches its highest position in the sky at that geographic location on a particular date. In one embodiment, solar noon may be defined as a range of time on either side of the moment of solar noon.

The solar event "afternoon" may be defined as a predetermined time period starting after solar noon and lasting until sunset at a geographic location on a particular date. Afternoon may begin at a mid-point between the time of solar noon and the time of sunset.

The solar event "sunset" may be defined as the time at which the trailing edge of the sun stops being visible and disappears below the western horizon in the evening at a geographic location on a particular date. In one embodiment, sunset may be defined as a range of time on either side of a moment of sunset. The time between sunrise and solar noon may or may not be equal to the time between solar noon and sunset, depending on the geographic location and the time of year.

The solar event "evening" may be defined as a predetermined time period from sunset until a time after sunset. In one embodiment, evening may be, for example, a twilight period of time in which sunlight still reaches the earth but after sunset at a geographic location. In one embodiment, evening may be a chosen artificial twilight period of time, such as, for example, a time period for which a user is awake after sunset, or a predefined time set by the user.

In some embodiments, astronomical/nautical definitions of solar times may be used to describe solar events. Astronomical dawn and dusk may be defined as the time when the sun is 18 degrees below the horizon respectively in the morning and evening, nautical dawn and dusk as the time when the sun is 12 degrees below the horizon respectively in the morning and evening, and civil dawn and dusk as the time when the sun is 6 degrees below the horizon respectively in the morning and evening. Astronomical twilight is the time range when the sun is between 12 and 18 degrees below the horizon, nautical twilight is the time range when the sun is between 6 and 12 degrees below the horizon, and civil twilight is the time range when the sun is between 0 and 6 degrees below the horizon. Astronomical, nautical, and civil twilight can each occur both in the morning and the evening. Night may be defined as the time between astronomical dusk and astronomical dawn, between sunset and sunrise, or by some other combination of solar positions, depending on the embodiment. Likewise, daylight may be defined as the time between sunrise and sunset, or some other combination of solar positions, depending on the embodiment.

It will be understood that the predetermined solar events may be defined differently, depending on the embodiment. Additionally, a user may shift the actual time of the solar events to artificial times. For example, a user who may be traveling to a second geographical location in a second time zone may shift the solar events to match the second geographical location in the second time zone, while still residing at the first geographical location in the first time zone, in order to condition their body in preparation for the travel.

Tunable Lighting Systems

Conventionally, lighting systems were either single-color or required complex color-programming at the source of the fixture or in an analog manner. In accordance with the present disclosure, DC tunable lighting control allows for central power control and central command control for changing light output of light fixtures to match lighting scenes based on solar events or other conditions, such as by assigning CCT and/or brightness, which may be used to maintain and/or correct circadian rhythms. Further, the present disclosures reduce the complexity for users to set-up such systems by eliminating analog programming and providing user interfaces that provide automatic and/or simplified programming.

Some luminaires (i.e. light fixtures) may provide two DC power inputs that respectively drive light sources (e.g. LEDs) in the luminaire. Such light fixtures depend on external DC power supplies to drive the two DC power inputs. These external DC power supplies may be integrated into a single unit with multiple DC power outputs, or they may be separate devices each having a single DC power output, depending on the embodiment, although a single system may use some DC power supplies with multiple outputs, and others with a single DC power output. As referred to herein, a DC power supply refers to a portion of a device that has a separately controllable DC power output and may refer to an entire stand-alone device or may refer to a portion of a larger device with multiple functions and/or DC power outputs. Thus, a device having a single DC power output is referred to as a DC power supply, and a device having four separately controllable DC power outputs may be referred to as a first DC power supply, a second DC power supply, a third DC power supply, and a fourth DC power supply. A system according to the present disclosure includes at least one device acting as one or more DC power supplies is connected to a power source, such as an AC power source (e.g. a 120 VAC power output driven from the AC power grid), a battery, a generator, a solar panel, or any other type or combination of types of power sources.

In some embodiments, the DC power supply may provide a set voltage and vary the current based on the number of luminaires (and therefore the number of LEDs) being driven. This may be referred to as a constant voltage (CV) driver. When this approach is used, the luminaires are connected in parallel with each other and the voltage provided by the DC power supply is set based on the specifications of the luminaires. In other embodiments, the DC power supply may provide a set current and vary the voltage based on the number of luminaires (and therefore the number of LEDs) being driven. This may be referred to as a constant current (CC) driver. When this approach is used, the luminaires are connected in series and the current provided by the DC power supply is set based on the specifications of the luminaires. Such luminaires have a power output which can be connected to the next luminaire in the series and a terminator may be used to complete the circuit on the last luminaire in the series.

Brightness of an LED can be controlled by modulating the power delivered by the driver (i.e. the DC power supply) to the LED load. Because LEDs have a non-linear response to voltage, analog modulation of the voltage for dimming is not commonly used with a CV driver. To dim an LED load with a CV driver, the power is commonly modulated using pulse width modulation (PWM) or pulse density modulation (PDM), both of which affect the percentage of a given time period that the voltage is applied to the LED load which digitally modulates the power delivered. The time period is typically chosen to be short enough that most people cannot detect any flickering, such as 16 milliseconds (ms) or less, with the PWM or PDM modulation being performed for each time period. So, for example if a 25% brightness is desired, a PWM system may repeatedly turn the voltage on for 4 ms and then turn off the voltage for 12 ms before turning the voltage back on again and repeating. It should be noted that DC power, as the term is used herein, encompasses a PWM or PDM modulated signal, even if the voltage during the 'off' periods goes negative, as long as substantially all of the power transfer to the LEDs is during the 'on' periods of the PWM/PDM modulation.

While a CC driver can use PWM or PDM to modulate the power delivered to the LED load, a CC driver can dim the LED load by changing the DC current level delivered to the LED load, which is an analog modulation of the power delivered. This technique for dimming an LED has an advantage over PWM and PDM in that it eliminates high frequency flicker from the LEDs that can cause health issues such as migraines. Note that as the current is modulated, the voltage level may vary in a non-linear way due to the characteristics of LEDs.

The DC power supplies, as the phrase is used herein, can use any technique to vary the amount of power delivered at their outputs, including those described above of PWM or PDM with a constant voltage or by regulating (or modulating) the current in an analog manner. The DC power supplies have the ability to communicate with a controller through a communication interface. Any type of communications interface may be used, including, but not limited to, DMX, Ethernet®, Wi-Fi®, universal serial bus (USB), Digital Addressable Lighting Interface (DALI), or optical communications.

The DC power supplies may be installed with their power outputs coupled to power inputs of one or more luminaires by any type of suitable electrical cable or conductor, including, Romex® NM cable, Ethernet cable (e.g. Cat5 or Cat6 cable), individual multi-stranded or solid insulated wires, a jacketed multi-conductor cable, or another type of cabling. The conductors used should have low-enough resistance to minimize the power lost in the cable (and heat generated) and be insulated to avoid short-circuits with other cables or metal structures. Appropriate regulations such as the Uniform Electrical Code should also be followed in the selection of the cable to use to connect the DC power supplies to the luminaires and in the installation of the lighting system.

Going back to the luminaires, in some embodiments, the first power input of the luminaire is used to drive as a first set of one or more LEDs having a first spectral characteristic (i.e. light having particular spectrum of output) having a first correlated color temperature (CCT) and the second power input of the luminaire is used to drive a second set of one or more LEDs having a second spectral characteristic having a second CCT.

The first set of LEDs in a luminaire may all be identical, such as all orange LEDs having a light output in a narrow spectral band at about 600 nanometers (nm) or all warm white LEDs using a phosphor to emit a broad spectrum of light output have a CCT of 2000K, or the first set of LEDs may be a mix of LEDs, such as a mix of red, green, and blue LEDs selected to emit a warm white output having a CCT of 2400K. Any mix of LEDs that when driven by an adequate amount of power through the first power input emits light with a CCT of less than about 4000K (i.e. >250 M) can be used for the first set of LEDs in the luminaires although some embodiments may use a first set of LEDs that emit light at a CCT of about 2400 K or lower (417 M or higher). The LEDs of the first set of LEDs may be referred to herein as "orange LEDs" even if they are actually some other type of LED, such as a red LED, a warm white LED, or a mix of LED types.

The second set of LEDs may all be identical, such as all blue LEDs having a light output in a narrow spectral band at about 480 nm or all cool white LEDs using a phosphor to emit a broad spectrum of light output have a CCT of 6500K, or the second set of LEDs may be a mix of LEDs, such as a mix of red, green, and blue LEDs selected to emit a cool white output having a CCT of 5000K. Any mix of LEDs that when driven by an adequate amount of power through the second power input emits light with a CCT of more than about 4000K (i.e. <250 M) can be used for the second set of LEDs in the luminaires although some embodiments may use a second set of LEDs that emit light at a CCT of about 5000K or higher (i.e. 200 M or lower). The LEDs of the second set of LEDs may be referred to herein as "blue LEDs" even if they are actually some other type of LED, such as a cool white LED or a mix of LED types.

Luminaires with a first set of LEDs emitting light with a first CCT driven by a first DC power input, and a second set of LEDs emitting light with a second CCT driven by a second DC power input may be referred to as tunable luminaires as their light output can be tuned to have a range of brightness and CCT depending on the relative power delivered to their two DC power inputs. Because the light output of an LED is non-linear with power, and different luminaires may use different types of LEDs, information about the characteristics of a particular luminaire may be useful in determining the power to provide to its two DC power inputs in order to achieve a particular target brightness and/or CCT of its light output. Such information may be provided in a profile for a particular luminaire or for a particular type of luminaire which may be identified, as a non-limiting example, by its manufacturer and model number. Profiles for a variety of different luminaires and/or types of luminaires may be predetermined by their manufacturer or by a third party and stored in a database, which may be accessible through the internet or distributed by some other method.

A lighting controller (which may also be referred to as a bridge controller or virtual bridge controller) may be used to control the lighting output of one or more luminaires. The lighting controller may be communicatively coupled to two or more DC power supplies which are then electrically connected to the two DC power inputs of one or more tunable luminaires as described above. The lighting controller may be configured to understand what DC power supplies it can control and what luminaires are coupled to the DC power supplies. This configuration may be automatically performed using standard or proprietary network discovery protocols, done manually by a user, or by a combination of automatic discovery and manual configuration.

The lighting controller may then obtain profiles for the luminaires that it is able to control. The profiles may be obtained automatically during the configuration process through retrieval from a database based on information received about the luminaires, or the profiles may be manually uploaded to the lighting controller by a person (e.g. a technician) configuring the system. The profiles provide information to the lighting controller about how much power should be provided to each DC power input of the luminaire in order to achieve a particular brightness and/or CCT for that luminaire.

At various times, the lighting controller may determine that the brightness and/or CCT for a set of (one or more)

luminaires connected to a pair of DC power supplies should be changed. It can use the target brightness and/or target CCT, along with the profile for the luminaires, to determine an amount of power that the two DC power supplies should provide in order to achieve the target brightness and/or target CCT and then it can send commands to the two DC power supplies to set them to deliver the calculated power to the set of luminaires.

The lighting controller may transmit signals to the two DC power supplies indicative of one or more changes in settings to produce changes in the light output from the luminaires at different times throughout the day, which may be referred to as one or more scenes. The lighting controller may transmit signals indicative of commands to the DC power supplies to send power, stop sending power, or change the amount of power sent, to produce one or more scenes that produce multiple changes in the light output from the luminaires at different times throughout the day.

The lighting controller may convert signals indicative of one or more changes in settings of the DC power supplies to DMX before transmitting the signals to the DC power supplies. However, it will be understood that the lighting controller may utilize other communication standards over any type of medium (e.g. wired, radio frequency, optical, and the like) for communications with the DC power supplies. In one embodiment, the lighting controller may transmit signals using UDP (User Datagram Protocol) or TCP (Transmission Control Protocol) to communicate through a wired network such as Ethernet or a wireless network such as Wi-Fi to control the output of the DC power supplies and to send power, stop sending power, or change the amount of power sent, to produce one or more scenes that produce multiple changes in the light output from the DC tunable luminaires at different times throughout the day. Some implementations may utilize Art-Net to transmit DMX information using UDP over Ethernet or some other network.

The change from a first scene, that is, a first CCT value and/or dimness/brightness for the light output of the luminaires, to a second scene, that is, a second CCT value and/or dimness/brightness for the light output of the luminaires, may be implemented as a step change or as a progressive change. A step change is an abrupt change that occurs from one moment to the next. A progressive change is a gradual change that takes place over time. In one embodiment, the gradual change is a series of small step changes between the beginning of the first scene and the beginning of the second scene.

For example, for the change from an "early morning" scene to a "sunrise" scene, the lighting controller may implement a step change from a 40% dim light output at a CCT having a value of 2000K to 100% brightness at 2600K at the minute of the time occurrence of sunrise. Alternatively, the lighting controller may implement a gradual change over a time period, for example 60 seconds, to change the brightness and CCT at a rate of 1% and 10 K per second to make the same amount of change at the sunrise solar event. In another embodiment, the change may take place over the entire period between events, so if the early morning event occurs 60 minutes prior to the sunrise event, the lighting controller may change the brightness and CCT at a rate of 1% and 10 K per minute to gradually change from 40% brightness at 2000K at the early morning event to 100% brightness at 2600K at sunrise.

The DC power supplies may receive the signal(s) indicative of the power changes and may send the indicated power to the first power input and second power input of the luminaires to produce the one or more scene. The luminaires then react by emitting the light output produced by the first LED(s) driven by the first DC power input and the second LED(s) driven by the second DC power input (either one of which may be turned off for some scenes) at the time(s) of the occurrence of the predetermined solar events and/or at predetermined times assigned for the predetermined solar events.

A lighting controller may use a profile for a tunable luminaire to compile a 24-hour program to control the tunable luminaire to have a human-centric lighting output compatible with human circadian rhythms. This program can be stored in solid state memory on a controller. The controller may be separate from or embedded within the power supply powering the luminaire. Power on/off to the fixture may be controlled by a standard single or multi pole toggle switch. When the circuit is closed, the connected light fixture produce light with the CCT and brightness as dictated by the system based on the time of day. The system can automatically adjust the CCT and brightness throughout the day for the purpose of circadian entrainment. The system may include a graphical user interface (GUI) on a user device which allows for the solar scenes to be customized for CCT and brightness. This customization may be global for an installation or unique to lighting zones within the system. The customized programming may be compiled on the user device and transferred to the controller. The default levels may remain on the controller allowing the controller to revert back to the default levels without extensive reprogramming. The controller may have more than one set of default levels, such as constant levels that may be used before the controller is initialized, and a default human-centric cycle based on the time of day that is compatible with most people's circadian rhythm.

Existing circadian lighting systems are typically wireless and depend on network communication on both the local and wide area network, both reducing reliability. Existing systems offer little or no options for customization of CCT and brightness. The system disclosed herein can function normally without a network connection. A network connection is only required if a user wants to customize scenes. The automatic, easily customized scenes and the reliability that comes from a network independent system may be factors in human-centric lighting being widely adopted.

The controller may ship with a default 24-hour program and to control connected fixtures to produce light for circadian entrainment indefinitely without additional configuration or intervention. If customization is desired, the system can also allow for that. Power level profiles may be created for human centric lights and stored in a central database accessible over the internet. Software (e.g. a mobile device app) can reference these profiles and determine the correct power levels for the connected fixtures to produce light for circadian entrainment for every minute throughout the day. The software can then create a 24-hour program for CCT and brightness for the installed fixtures and transfer the program to a controller. The controller can run the program and send commands to power supplies to send the programmed power levels to connected light fixtures to produce light of a predetermined CCT and brightness for the time of day.

If a user so chooses, a GUI may be provided on a user device which allows for further customization of scenes by changing transition times, color (including CCT), and/or brightness. This customization may be applied to the entire lighting installation or limited to zones within the installation, such as rooms within a home and may be set up to be temporary for a specific period, or permanent until changed again. This is useful if persons with differing sleep time inclinations occupy the same home. Persons traveling to time zones other than the one they typically occupy may desire levels similar to the location to which they are traveling or said person may desire the levels of their original time zone at their destination. Persons required to keep schedules other than the traditional wake/sleep cycles may desire levels to boost attention and productivity during times aligning with their schedule.

One leg of each power connection for the installed fixtures may connected to a toggle switch. This switch can close or open the circuit, supplying or removing power from the connected fixtures for local on/off control. In addition, some embodiments allow the user to easily reverted to the default programming. This may be useful in homes with new occupants, hospitals, and hospitality rooms where occupants change regularly, and/or education settings where needs may change from year to year.

Human-centric lighting (HCL) systems have traditionally used wireless control connections and require a cloud network component to operate. They typically do not allow for any customization and may not even offer basic information about what lighting levels they are producing throughout the day. Existing systems are easy to install since they utilize wireless bulbs, but configuration is difficult and missed commands are common with wireless communication. Wireless communication may not be possible in some installations, excluding many locations that can utilize the benefits of HCL. Thus, the lighting controllers described herein may be put to advantageous use in many environments where existing systems cannot.

Reference now is made in detail to the examples illustrated in the accompanying drawings and discussed below.

FIG. 1A shows a block diagram of an embodiment of a lighting system 100A. The lighting system 100A includes one or more luminaires 130 each comprising a first LED having a first spectral characteristic driven by a first direct-current (DC) power input 131 and a second LED having a second spectral characteristic driven by a second DC power input 132. Embodiments of the luminaire 130 may have any number of LEDs coupled to each of the two DC power inputs 131, 132. The lighting system 100A also includes a first DC power supply 121, separate from the one or more luminaires 130, electrically coupled to the first DC power input 131 of the one or more luminaires 130 to drive the first LEDs of the one or more luminaires 130, and a second DC power supply 122, separate from the one or more luminaires 130, electrically coupled to the second DC power input 132 of the one or more luminaires 130 to drive the second LEDs of the one or more luminaires 130. The electrical coupling of the DC power supplies 121, 122 to the DC power inputs 131, 132 of the one or more luminaires 130 can be done with any type and number of electrical conductors and/or cables.

In some embodiments, the lighting system 100A may include a second luminaire 140 that has a third set of LEDs having a third spectral characteristic coupled to a first power input 141 of the second luminaire 140 and a fourth set of LEDs having a fourth spectral characteristic coupled to a second power input 142 of the second luminaire 140. The lighting system 100A may also include a third DC power supply 123 electrically coupled to the first DC power input 141 of the second luminaire 140 to drive the third LEDs of the second luminaire 140, and a fourth DC power supply 124 electrically coupled to the second DC power input 142 of the second luminaire 140 to drive the fourth LEDs of the second luminaire 140.

The lighting system 100A also includes a lighting controller 110, communicatively coupled to the first DC power supply 121 and the second DC power supply 122 and in some embodiments to the third DC power supply 123 and fourth DC power supply 124. The lighting controller 110 is separate from the one or more luminaires 130, 140 and may be separate from the DC power supplies 121-124. The lighting controller 110 is communicatively coupled to the DC power supplies 121-124 by a communication channel 120. The communication channel 120 can be any appropriate set of unidirectional or bidirectional point-to-point communication links between the lighting controller 110 and the power supplies 121-124, including individual direct links to each power supply 121-124 from the lighting controller 110, a hierarchical tree connection channel such as USB, or a daisy-chained communication link such as DMX. The communication channel may also be a bus or network over a wired or wireless media such as, but not limited to, DALI, Ethernet, Wi-Fi, the internet, a mobile telephony network (e.g. a 3G/4G/5G network), and/or Bluetooth®.

The lighting controller 110 may be a dedicated device, purpose-built to be a lighting controller, which may be referred to as a bridge controller as it provides a bridge from a user to the DC power supplies 121-124 used to control the luminaires 130, 140. In some embodiments, the lighting controller 110 may utilize a general-purpose computing device, such as a computer or a server, running software to implement the functionality of the lighting controller 110, which may be referred to as a virtual bridge controller. The lighting controller 110 may be located in the same building as the luminaires 130, 140 and be directly wired to the DC power supplies 121-124, but in some embodiments the lighting controller 110 may utilize a remote server, such as a cloud server, and communicate with the user 150 and the DC power supplies 121-124 over the internet.

The lighting controller 110 includes a processor 111 which can be any type of computing device, including, but not limited to, a 32-bit or 64-bit central processing unit (CPU) from Intel or AMD having one or more X86 architecture cores, an embedded ARM® architecture CPU with one or more cores, an 8-bit 8051 architecture processor core, a 32-bit Coldfire processor core, a RISC-V processor core, or any other processor core using any reduced instruction set computer (RISC) or complex instruction set computer (CISC) instruction set architecture having any instruction bit length. The processor 111 may also be implemented in a field-programmable gate array (FPGA) in some embodiments or using an application-specific integrated circuit (ASIC). The lighting controller includes one or more memory devices 115, such as a dynamic random-access memory (DRAM) and/or a non-volatile flash memory device, coupled to the processor 111, which can store instructions 117 for the processor 111 to perform any method disclosed herein. In some embodiments, the one or more memory devices 115 may include a user-removeable memory device, such as a Secure Digital (SD) Card or a USB drive.

The lighting controller 110 also includes a power supply control interface 113 and may optionally include a network interface 112, each coupled to the processor 111. In some embodiments, the power supply control interface 113 and the network interface 112 may be one and the same (e.g. an Ethernet interface), but in other embodiments, they may be separate interfaces (e.g. a DMX interface for the power supply control interface 113 and a Wi-Fi interface for the network interface 112). The power supply control interface 113 provides an interface to the communication link 120 used for communication with the power supplies 121-124 while the network interface 112 provides an interface to connections used to communicate with control devices such as the remote control 153 and/or the wall switch 157, as well as other electronic devices which may be used to configure and/or control the lighting system 100A. The network interface 112 may also provide the lighting controller 110 with access to the internet. Note that the wall switch 157 might not be a traditional 120 VAC switch but may simply be a device which reports the position of a switch (e.g. open or closed, or a brightness level based on a slider or knob) to the lighting controller through the network interface 112 and may not directly control any current flow to the one or more luminaires 130, 140. In some embodiments the network interface 112 may be used to communicate with the database 119, but other embodiments of the lighting controller 110 may have a dedicated interface for the database 119, such as serial attached storage interface (SATA) or small-computer serial interface (SCSI). The power supply control interface 113 and the network interface 112 can be interfaces to any appropriate communications link, including, but not limited to, DMX, DALI, Ethernet, and Wi-Fi.

The lighting controller 110 is configured to obtain a target CCT for the one or more luminaires 130, 140 and obtain a profile for the luminaire 130. The target CCT may be obtained from a user 150 using a remote control 153, a pre-defined scene associated with a solar event or a time, or from any other source. Predefined scenes, solar events, and/or times, may be stored in the memory 115, in the database 119, in a cloud server accessible over the internet, or in any other location. The profile may be stored in memory 115 or may be obtained from a database 119 based on information about the luminaire, such as a model number. The database may be embedded in the lighting controller 110, may be local with a direct connection to the lighting controller 110, or may be remote, such as being hosted by a cloud server or a web server accessible to the lighting controller 110 over the internet. In other embodiments, the profile may be provided by a technician during a configuration of the lighting system 100A.

The lighting controller 110 is further configured to calculate a first target power for the first DC power input 131 of the luminaire 130 and a second target power for a second DC power input 132 of the luminaire 130 based on the target CCT and the profile. The first target power and the second target power are calculated to drive the luminaire 130 to emit light at the target CCT. The lighting controller 130 is also configured to control the first DC power supply 121 to deliver the first target power to the first DC power input 131 of the luminaire 130 and the second DC power supply 122 to deliver the second target power to the second DC power input 132 of the luminaire 130. The lighting controller 110 can control the DC power supplies 121, 122 by sending commands over the communication link 120 to the DC power supplies 121, 122.

In embodiments that include the second luminaire 140 driven by the third and fourth DC power supplies 123, 124, the lighting controller 110 is configured to obtain a second profile, different than the first profile, for the second luminaire 140 and to calculate a third target power for a first DC power input 141 of the second luminaire 140 and a fourth target power for a second DC power input 142 of the second luminaire 140 based on the target CCT and the second profile. The third target power and the fourth target power are calculated to drive the second luminaire 140 to emit light at the target CCT. Note that because the first luminaire 130 may have different characteristics than the second luminaire 140, the first and second target power may be different than the third and fourth target power but still allow both the first luminaire 130 and the second luminaire 140 to emit light at the target CCT and brightness. Once the third power target and the fourth power target have been calculated, the lighting controller 110 may be configured to control the third DC power supply 123 to deliver the third target power to the first DC power input 141 of the second luminaire 140 and a fourth DC power supply 124 to deliver the fourth target power to the second DC power input 142 of the second luminaire 140.

Note that the lighting controller 110 may be able to fully function without the use of the network interface 112 by using default scenes built into the controller 110 and stored in the memory 115. Thus, embodiments without a network interface 112 are possible. Some embodiments may function in a default mode but still include a network interface 112 to allow a user 150 to optionally customize its scenes.

Figure 1B:
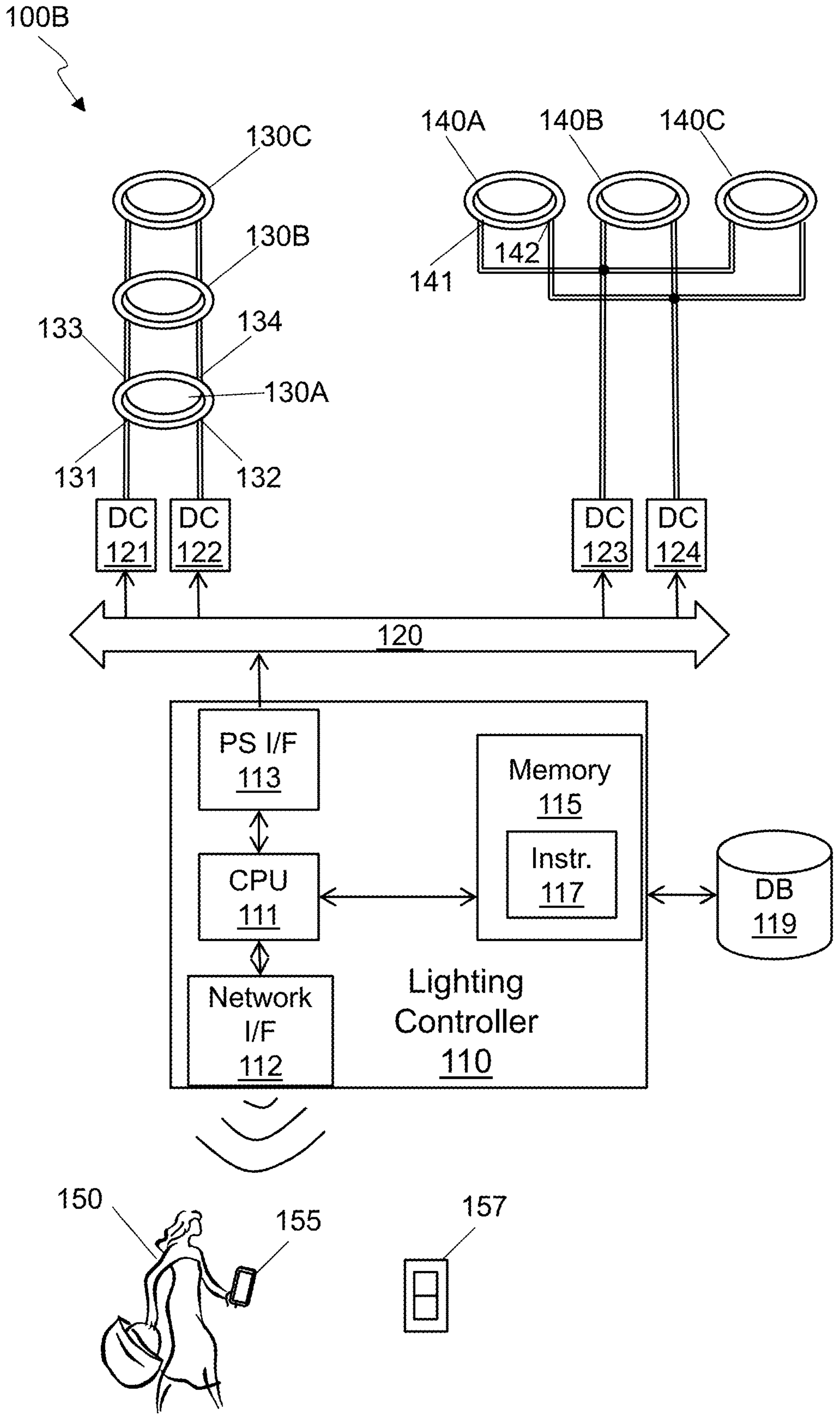
FIG. 1B shows a block diagram of an embodiment of an expanded lighting system.

FIG. 1B shows a block diagram of an embodiment of an expanded lighting system 100B. The expanded lighting system 100B includes the elements of the lighting system 100A but has additional luminaires added. In addition, the user 150 is shown holding a mobile electronic device 155 instead of a remote control 153, although the remote control 153 could be used with the expanded lighting system 100B and the mobile electronic device 155 could be used with the lighting system 100A. Elements described for lighting system 100A above are still relevant to the expanded lighting system 100B and descriptions of some elements may not be repeated here.

The expanded lighting system 100B includes the lighting controller 110 which includes a power supply control interface 113 configured to communicate with two or more power supplies 121-124, and a network interface 112, which may be one and the same as the power supply control interface 113 or may be a different network interface, that may be used for communication with a mobile electronic device 155 to allow the user 150 to configure and/or control the lighting system 100B. The lighting controller 110 also includes a processor 111 coupled to the power supply control interface 113, and one or more memory devices 115 coupled to the processor 111 and storing instructions 117 to program the processor 111 to perform one or more of the methods described herein.

In at least one embodiment, the instructions 117 program the processor 111 to perform a method that includes obtaining a target CCT for the one or more luminaires 130A/B/C, 140A/B/C. The target CCT may be obtained in any way, depending on the embodiment, including determining a solar position for a location of the one or more luminaires 130A/B/C, 140A/B/C and determining the target CCT based on the solar position, determining a clock time for a location of the one or more luminaires and determining the target CCT based on the clock time and the location, or receiving the CCT from a user control provided through a device such as the wireless remote control 153, mobile electronic device 155 with a graphical user interface, or wall switch 157. The target CCTs to be used for different time periods identified may have been previously set by the user 150 or by a technician at a time that the lighting system 100B was configured or may be obtained from a site manager or building manager through another electronic device in communication with the lighting controller 110. In addition to, or in place of, the target CCT, a user control may include a brightness setting and/or an on/off control.

In some embodiments, scenes may be predefined based on clock times or solar events that set a CCT and/or brightness level, with the scene used to obtain the target CCT. In some embodiments, those scenes may automatically control the luminaires 130A/B/C, 140A/B/C to turn on at the specified CCT/brightness and/or turn off for the predefined scene, but in other embodiments, the scenes may set a default CCT and/or brightness for that period based on clock time and/or solar events for the location of the luminaires 130A/B/C, 140A/B/C and other factors are used to determine whether or not the luminaires 130A/B/C, 140A/B/C are off or are turned on at the specified CCT and/or brightness defined by the scene. So, the light switch 157 may be used to determine whether the first luminaires 130A/B/C and/or luminaires 140A/B/C are on or not, but when on, the CCT and/or brightness is controlled by the predefined scene. Scenes may also include setting for whether or not to override the current on/off, CCT, and/or brightness settings for a luminaire or set of luminaires 130A/B/C, 140A/B/C.

A first profile associated with a first luminaire 130A may also be obtained. This may be accomplished by obtaining a type identifier of the first luminaire 130A, such as, but not limited to, a model number, a serial number, a manufacturer, information received from the first luminaire over a digital communication link, information from an RFID tag, and/or information from a QR code, and retrieving the first profile from a database 119 storing a plurality of profiles based on the model number of the first luminaire 130A. The type identifier may be received directly from the first luminaire 130A using a network discovery protocol, received from the user 150 through their mobile electronic device 155, or obtained by some other mechanism. In some embodiments, the type identifier may be obtained through an RFID tag embedded in the first luminaire 130A that may be read by the mobile electronic device 155 during configuration or from a QR code from a tag attached to the first luminaire 130A or included on documentation provided with the first luminaire 130A that may be captured by a mobile electronic device 155 during configuration.

The profile may provide information about what power needs to be provided to the two DC power inputs 131, 132 of the first luminaire 130A to achieve the target CCT (and/or target brightness). The profile may include a set of pairs of power supply values corresponding to different CCT values at full brightness, a table of pairs of power supply values with different rows corresponding to different brightness values and different columns corresponding to different CCT values, coefficients for pre-determined equations that calculate power supply values based on CCT values and/or brightness values (e.g. polynomial equations of degree 2, 3, 4, 5, 6, or 7), symbolic representations of equations that calculate power supply values based on CCT values and/or brightness values, computer code to calculate the power supply values based on CCT values and/or brightness values, or any other representation of how to calculate power supply values for a particular CCT and/or brightness value for a particular luminaire.

In some embodiments, a state of the switch 157, a command from the remote control 153, or a command from the mobile electronic device 155 is sent to the lighting controller 110 and used to control whether the luminaire 130A/B/C is on or off, but the target CCT and/or brightness set by a scene is used to set the target DC power delivered to the luminaire 130A/B/C so that the luminaire 130A/B/C emits light at the target CCT and/or brightness when turned on. In some embodiments, an actual physical switch on the connections between the DC power supplies 121,122 and the luminaires 130A/B/C may be used to determine whether the luminaires 130A/B/C are on with the lighting controller 110 controlling the DC power supplies 121, 122 to deliver the calculated DC power levels to the luminaires 130A/B/C when the switch is on. In another embodiment, an AC power switch may control whether AC power is provided to the DC power supplies 121, 122 with the lighting controller 110 controlling the DC power supplies 121, 122 to deliver the calculated DC power levels to the luminaires 130A/B/C when the switch is on.

The method performed by the processor 111 also includes calculating a first target power for the first DC power input 131 of the first luminaire 130A and a second target power for a second DC power input 132 of the first luminaire 130A based on the target CCT and the first profile. The first target power and the second target power are calculated to drive the first luminaire 130A to emit light at the target CCT. In some embodiments the method performed by the processor 111 also includes obtaining a target brightness setting for the one or more luminaires 130A/B/C and calculating the first target power and the second target power further based on the target brightness setting and the first profile, where the first target power and the second target power are calculated to drive the first luminaire 130A to emit light at the target brightness with the target CCT. The processor 111 then controls the first DC power supply 121 to deliver the first target power to the first DC power input 131 of the first luminaire 130A and a second DC power supply 122 to deliver the second target power to the second DC power input 132 of the first luminaire 130A.

The expanded lighting system 100B also includes a second luminaire 140A that is driven by a third DC power supply 123 coupled to its first DC power input 141 and a fourth DC power supply 124 coupled to its second DC power input 142. The method performed by the processor 111 may also then include obtaining a second profile, different than the first profile, for the second luminaire 140A. This may be done using a type identifier of the second luminaire 140A to retrieve the second profile from the database 119 or by using any other method, such as those describe above. The method performed by the processor 111 also includes calculating a third target power for a first DC power input 141 of the second luminaire 140A and a fourth target power for a second DC power input 142 of the second luminaire 140A based on the target CCT (and/or brightness) and the second profile. The third target power and the fourth target power are calculated to drive the second luminaire 140A to emit light at the target CCT (and/or brightness). The processor 111 then controls the third DC power supply 123 to deliver the third target power to the first DC power input 141 of the second luminaire 140A and a fourth DC power supply 124 to deliver the fourth target power to the second DC power input 142 of the second luminaire 140A.

In the expanded lighting system 100B there are additional luminaires added to create a first set of luminaires 130A, 130B, 130C driven by the first and second DC power supplies 121, 122 and a second set of luminaires 140A, 140B, 140C driven by the third and fourth DC power supplies 123, 124. In order to provide enough power to each of the luminaires in a set of luminaires, the processor 111 determines that N other luminaires 130B, 130C of the one or more luminaires are also associated with the first profile and that a first DC power input and a second DC power input of the N other luminaires 130B, 130C are respectively electrically coupled to the first DC power input 131 and the second DC power input 132 of the first luminaire 130A, The first DC power supply 121 is then controlled by the processor 111 to deliver N+1 times the first target power and the second DC power supply 122 is controlled by the processor 111 to deliver N+1 times the second target power.

Note that there are two different ways that two or more luminaires can be coupled to the same set of DC power supplies, serially (as shown for the first set of luminaires 130A, 130B, 130C), and in parallel (as shown for the second set of luminaires 140A, 140B, 140C). So, if the processor 111 determines that the first luminaire 130A and the N other luminaires 130C, 130C are serially coupled to the first DC power supply 121 and to the second DC power supply 122, the processor 111 sets voltages of the first DC power supply 121 and the second DC power supply 122 based on N. For example if the first set of luminaires are all of the same type and the first luminaire 130A expects to be driven at 12 VDC for full brightness at each DC power input 131, 132 (which may be determined based on the first profile), the first and second DC power supplies 121, 122 may be set for a voltage of 3×12=36 VDC and the power delivered controlled by pulse-width modulation (PWM) or pulse-density modulation (PDM) of the outputs to provide the target CCT and/or target brightness.

But if the processor 111 determines that the second luminaire 140A and the N other luminaires 140B, 140C are coupled in parallel to the third DC power supply 123 and to the fourth DC power supply 124, the processor 111 may set currents of the third DC power supply 123 and the fourth DC power supply 124 based on N. So, for example, if the second set of luminaires 140A, 140B, 140C are all of the same type and the calculated current based on the second profile and target CCT and/or brightness is 1 A for the first DC power input and 2 A for the second DC power input, the processor 111 may multiply those values by 3 to determine how to set the DC power supplies 123, 124.

Figure 1C:
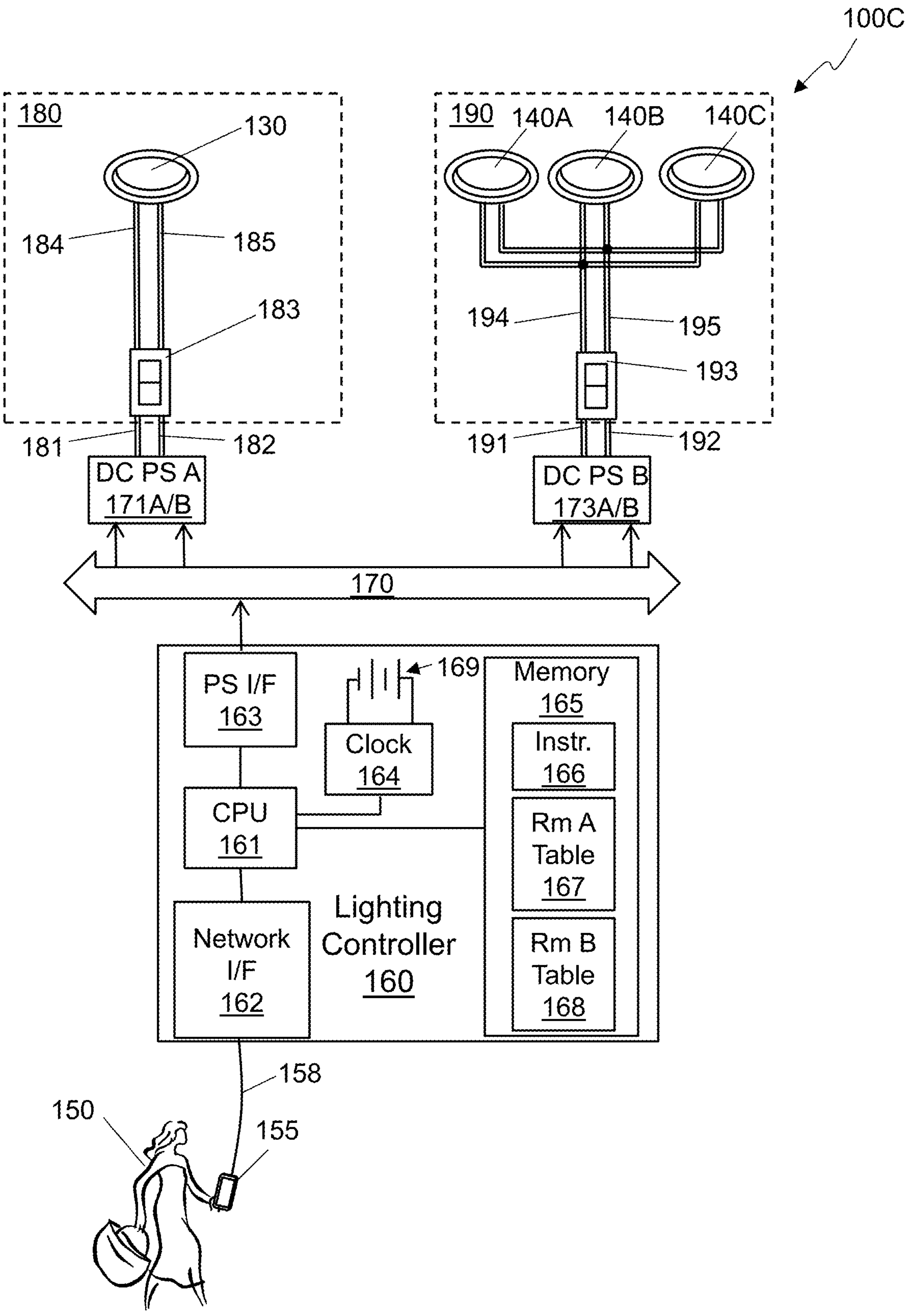
FIG. 1C shows a block diagram of an alternative embodiment of a lighting system.

FIG. 1C shows a block diagram of an alternative embodiment of a lighting system 100C. The lighting system includes at least one luminaire 130, each comprising a first LED having a first spectral characteristic driven by a first direct-current (DC) power input 184 and a second LED having a second spectral characteristic driven by a second DC power input 185. The system 100C also includes a first DC power supply 171A, separate from the at least one luminaire 130, having a first DC power output 181, and a second DC power supply 171B, separate from the at least one luminaire 130, having a second DC power output 182. In some embodiments, the first DC power supply 171A and the second DC power supply 171B may be integrated into a single multi-output power supply having both the first DC power output 181 and the second DC power output 182.

A switch may be coupled to the first DC power input 184 and the second DC power input 185 of the at least one luminaire 130, and to the first DC power output 181 of the first DC power supply 171A and the second DC power output 182 of the second DC power supply 171B. The switch has an ON state where power from the first DC power output 181 of the first DC power supply 171A flows through the switch 183 to the first DC power input 184 of the at least one luminaire 130, and power from the second DC power output 182 of the second DC power supply 171B flows through the switch 183 to the second DC power input 185 of the at least one luminaire 130. The switch also has an OFF state where no power flows into the at least one luminaire 130 from the first DC power supply 171A or the second DC power supply 171B. The switch may have a double-pole configuration with a first pole switching a connection (such as the positive or the negative leg) of the first DC power supply 171A and the second pole switching a connection (such as the positive or the negative leg) of the second DC power supply 171B, isolated from each other. In other installations, the switch may have a single-pole configuration switching a connection shared by the first DC power supply and the second DC power supply (i.e. a shared leg).

The system 100C also includes a lighting controller 160 communicatively coupled to the first DC power supply 171A and the second DC power supply 171B through a power supply interface 163 by a communication channel 170 and including a clock 164 to provide a time of day. While the lighting controller 160 is shown as a separate device, it may be integrated into a DC power supply such as the multi-output power supply 171A/B. The communication channel 170 can be any type of communication channel using any type of protocol including those discussed for the communication channel 120 above. The lighting controller 160 is configured to (a) determine a first setting for the first DC power supply 171A and a second setting for the second DC power supply 171B based on the time of day, and (b) send the first setting to the first DC power supply 171A and the second setting to the second DC power supply 171B at the time of day independent of the state of the switch 183. The power supply settings may be based on a target characteristic for the at least one luminaire 130 at the time of day. The target characteristic may be any combination of one or more of a correlated color temperature (CCT), a brightness, a hue, a saturation, a lightness, or other characteristics of light. Specific examples of the target characteristic, include, but are not limited to, a brightness, a CCT, a CCT and brightness, and a hue/saturation/lightness combination. The lighting controller 160 periodically repeats (a) and (b) as the time of day changes.

Figure 6A:
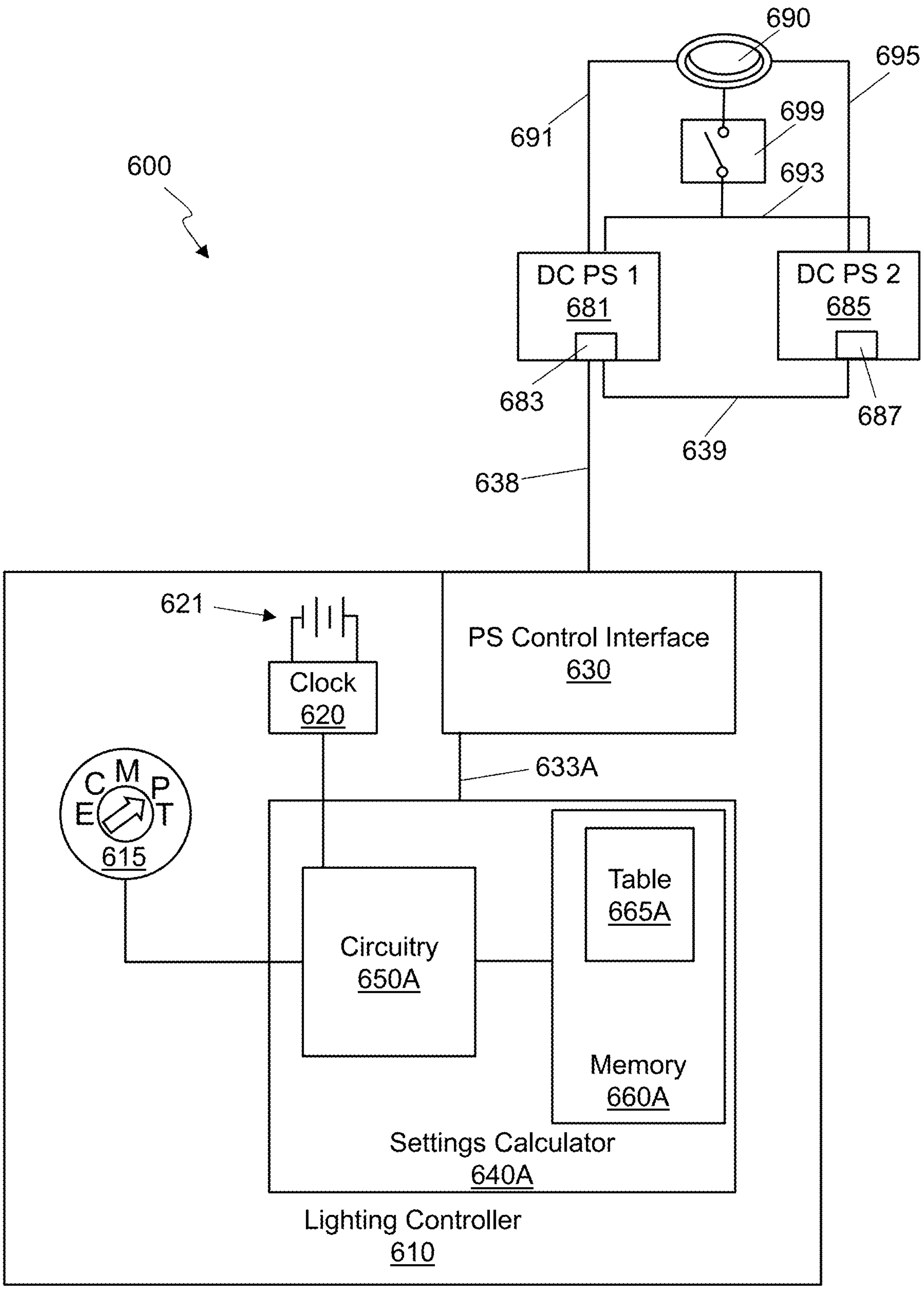
FIG. 6A shows a block diagram of an alternative embodiment of a lighting system using an alternative embodiment of a lighting controller.

Different implementations of the lighting controller 160 may use different circuitry such as that shown in FIG. 6A/B/C but the lighting controller 160 shown in FIG. 1C includes a CPU 161 coupled to the power supply interface 163, clock 164, and one or more memory devices 165. The clock 164 may have a battery 169 to allow the clock 164 to keep an accurate time of day even if the lighting controller 160 is disconnected from power. The lighting controller 160 may be powered from an alternating-current (AC) power source, a DC power source, a battery, or any other appropriate power source.

The memory 165 includes instructions 166 that if executed by the CPU 161, cause the lighting controller to perform a method for controlling a light characteristic of a luminaire as described herein. The memory 165 may also include table A 167 of information for the luminaire 130 that can be used to determine lighting characteristics for the luminaire 130 at various times of day. In some embodiments, the table A 167 may provide a target characteristic for the luminaire 130 explicitly or implicitly associated with a time of day that can then be used by the lighting controller 160 to calculate power supply settings to send to the DC power supplies 171A/B using a profile for the luminaire 130 describing its characteristics or using generic calculations to determine power supply settings based on the target characteristics (e.g. CCT and/or brightness). In other embodiments, the table A 167 may directly store power supply settings for the DC power supplies 171A/B explicitly or implicitly associated with a times of day. The table A 167 may include explicit times associated with each set of information or the period for updating the power supply settings may be implicitly assumed, such as storing one set of information for each hour of a day (24 sets of information), one set of information for each 15 minutes of a day (96 sets of information), one set for each minute of a day (1440 sets of information), one set of information for each hour of a week (168 sets of information), or any other number of sets of information to be evenly distributed over a predetermined period of time. The table A 167 may be used to calculate power supply settings for one or more sets of two or more DC power supplies, such as the multi-output power supply 171A/B and may be associated with a room A 180 or other grouping of luminaires 130 in one or more circuits.

In some embodiments, the memory 165 may include a second table B 168 of information for luminaires 140A/B/C that may be associated with a second room B 190 that can be used to determine lighting characteristics for the luminaires 140A/B/C at various times of day. The luminaires 140A/B/C are shown connected in parallel, driven by a first DC power connection 194 and a second DC power connection 195 and are commonly switched by switch 193 which is connected to the first DC power output 191 and the second DC power output 192 of the multi-output DC power supply 173A/B. Power settings may be sent from the lighting controller 160 through its power supply interface 162 over the connection 170 to the multi-output DC power supply 173A/B.

In some embodiments, the table B 168 may provide the target characteristic for the luminaires 140A/B/C explicitly or implicitly associated with a time of day that can then be used by the lighting controller 160 to calculate power supply settings to send to the DC power supplies 173A/B using a profile for the luminaires 140A/B/C describing its characteristics or using generic calculations to determine power supply settings based on the target characteristics (e.g. CCT and/or brightness). In other embodiments, the table B 168 may directly store power supply settings for the DC power supplies 173A/B explicitly or implicitly associated with a times of day. The table B 168 may include explicit times associated with each set of information or the period for updating the power supply settings may be implicitly assumed, such as storing one set of information for each hour of a day (24 sets of information), one set of information for each 15 minutes of a day (96 sets of information), one set for each minute of a day (1440 sets of information), one set of information for each hour of a week (168 sets of information), or any other number of sets of information to be evenly distributed over a predetermined period of time. The times associated with the sets of information stored in table B 168 may be the same as for those stored in table A 167 or may be different, depending on the embodiment. The table 168 may be used to calculate power supply settings for one or more sets of two or more DC power supplies, such as the multi-output power supply 173A/B and may be associated with a room B 190 or other grouping of luminaires 140A/B/C in one or more circuits.

Some versions of the lighting controller 160 may include a network interface 162 that may communicate with an external device 155 through a connection 158 which may be wired (e.g. a USB connection) or wireless (e.g. Bluetooth or WiFi). The lighting controller 160 may be configured to receive information useable to determine a first setting for the first DC power supply 171A and the second setting for the second DC power supply 171B based on the time of day. The information may be stored in the table A 167 or may be used as a temporary setting for the power supplies 171A/B.

The external device 155 may be a system controller that includes a processor, a user interface (e.g. a GUI) and a network interface both coupled to the processor, and a memory storing instructions that if executed by the processor, cause the system controller 155 to receive an input through the user interface, use the input to select the target characteristic for the at least one luminaire 130 at the time of day, use the target characteristic to generate the information useable to determine the first setting for the first power supply 171A and the second setting for the second power supply 171B, and send the information to the lighting controller 160 through the network interface of the system controller and the network interface 162 of the lighting controller 160.

The CPU 161 executing the instructions 166 and accessing the table 167 in the memory 165 may be referred to as an embodiment of a settings calculator. The settings calculator may be enabled to receive a table 167 through the network interface 162, store the table 167 in the memory device 165, retrieve information from the table 167 based on the time of day, and generate a set of power supply settings based on the information. The power supply control interface 163 can send the set of power supply settings to two or more power supplies 171A/B which are coupled to the luminaire 130, independent of an ON/OFF state of the luminaire 130.

The settings calculator may be enabled to receive a second table 168 through the network interface 162, store the second table 168 in the memory device 165 in addition to a first table 167 holding the information stored therein, retrieve second information from the second table 168 based on the time of day, and generate a second set of power supply settings based on the second information. The power supply control interface 163 can send the second set of power supply settings to additional power supplies 173A/B, different than the two or more power supplies 171A/B, coupled to additional luminaires 140A/B/C, different than the luminaire 130, independent of an ON/OFF state of the additional luminaires 140A/B/C. The second set of power supply settings associated with a particular time of day are based on a target characteristic for the additional luminaires 140A/B/C that may be different than the target characteristic for the luminaire 130 at the particular time of day.

The lighting controller 160 may be configured in some cases to set the time of day of the clock 164 by communicating over the network interface and the settings calculator of the lighting controller may be configured to use constant default values for the power supply settings until the clock has set the time of day.

Figure 2A:
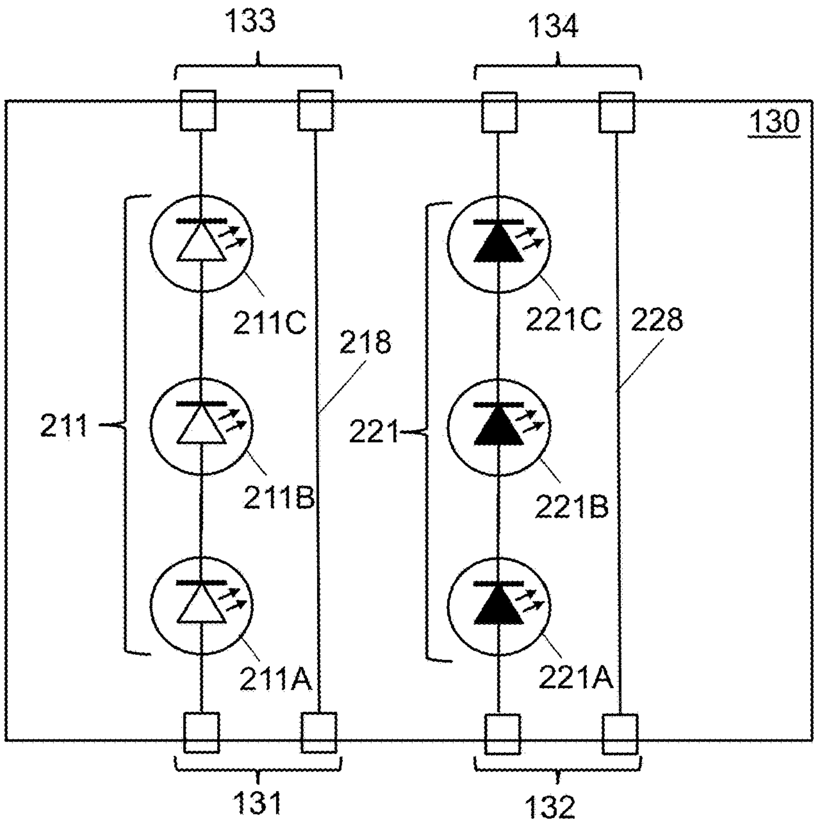
FIGS. 2A and 2B are schematic diagrams embodiments of luminaires suitable for use in the expanded lighting system of FIG. 1B.
Figure 2B:
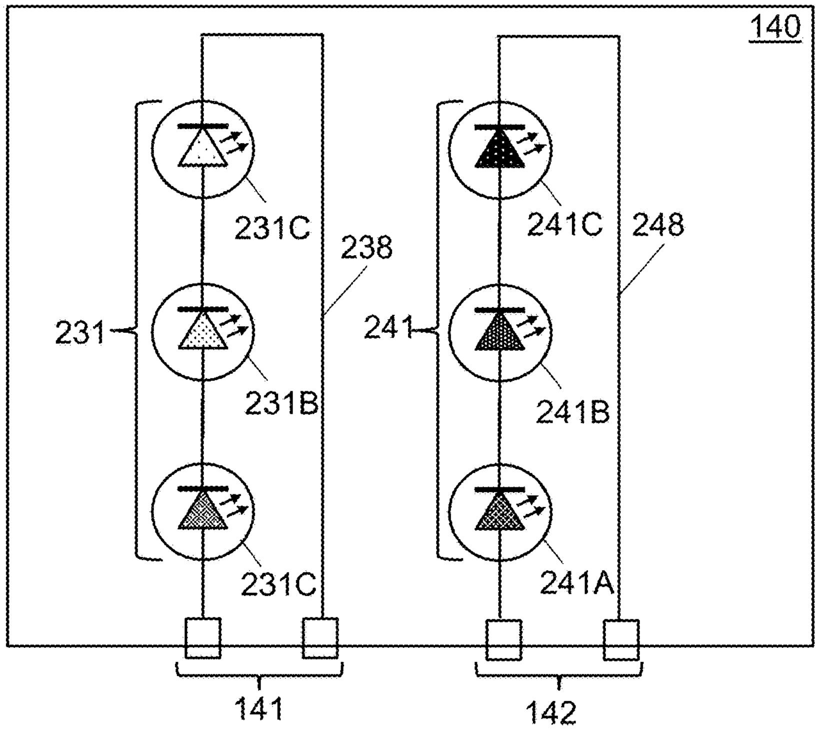

FIG. 2A is a schematic diagram of an embodiment of the first luminaire 130 (also used for 130A, 130B, and 130C) and FIG. 2B is a schematic diagram of an embodiment of the second luminaire 140 (also used for 140A, 140B, and 140C) of the lighting systems 100A, 100B, and 100C. The embodiments shown are as an example only and other embodiments may include any other number and/or configuration of two sets of LEDs driven from two DC power inputs where the first set of LEDs has a CCT of less than 4000K and the second set of LEDs has a CCT of greater than 4000 K. So, in at least some embodiments, a luminaire for use in the lighting system 100B has no electrical power inputs other than the first DC power input 131/141 and the second DC power input 132/142. In other embodiments, a luminaire having more than two DC power inputs, such as a first DC power input for a set of red LEDs, a second DC power input for a set or green LEDs, and a third DC power input for a set of blue LEDs may be used, coupled to three DC power supplies under control of a lighting controller as described herein.

The first luminaire 130 includes a first set of LEDs 211 that has three identical first LEDs 211A, 211B, 211C connected in series between the first DC power input 131 and the first power output 133. The first LEDs 211A, 211B, 211C may have a narrow band emission of orange light or may utilize a phosphor to emit a warm white light as a wide band emission. The first set of LEDs 211, when driven from the first DC power input 131, emit light having a CCT less than 4000 K, such as 2700 K, 2400 K, 2000 K or lower.

The first luminaire 130 includes a second set of LEDs 221 that has three identical second LEDs 221A, 221B, 221C connected in series between the second DC power input 132 and the second power output 134. The second LEDs 221A, 221B, 221C may have a narrow band emission of blue light or may utilize a phosphor to emit a cool white light. The second set of LEDs 221, when driven from the second DC power input 132, emit light having a CCT greater than 4000K, such as 5000K, 6000K, or higher. Note that while each set of LEDs is shown with its own separate return path, in some embodiments, a shared return path may be used to reduce the combined number of contacts for the combined first and second power inputs 131, 132 from four to three.

The first luminaire 130 is designed to be used with other luminaires of the same type in series. So, looking at FIG. 1B, the first power input of luminaire 130B is electrically connected to the first power output 133 of the first luminaire 130A and the second power input of luminaire 130B is electrically connected to the second power output 134 of the first luminaire 130A (thereby electrically coupling the first and second power inputs of the luminaire 130B with the first and second power inputs 131, 132 of the first luminaire 130A). Configurations may support any number of luminaires in series depending on the characteristics of the first power supply 121 and the second power supply 122 along with the power requirements of the first luminaire 130. A terminator may be connected between the two contacts of the first power output and between the two contacts of the second power output of the final luminaire in the series to allow for a return path of the current. A luminaire 130 shown in any of the figures provided herein can be assumed to have the terminator included if one of ordinary skill would deem it to be appropriate (e.g. a single luminaire 130 in a lighting circuit or the last luminaire 130C in a series-connected group of luminaires 130.

FIG. 2B is a schematic diagram of an embodiment of the second luminaire 140. The second luminaire 140 includes a first set of LEDs 231 that has three different first LEDs 231A, 231B, 231C connected in series between the power and return connections of the first DC power input 141. The first LEDs 231A, 231B, 231C may individually have a narrow band emission of light or may utilize a phosphor to emit a spectrum of color. The first set of LEDs 231, when driven from the first DC power input 141, emit light having a CCT less than 4000K, such as 2700 K, 2400 K, 2000 K or lower.

The second luminaire 140 includes a second set of LEDs 241 that has three different first LEDs 241A, 241B, 241C connected in series between the power and return connections of the second DC power input 142. The first LEDs 241A, 241B, 241C may individually have a narrow band emission of light or may utilize a phosphor to emit a spectrum of color. The second set of LEDs 241, when driven from the second DC power input 142, emit light having a CCT greater than 4000K, such as 5000K, 6000K, or higher. Note that while each set of LEDs is shown with its own separate return path, in some embodiments, a shared return path may be used to reduce the combined number of contacts for the combined first and second power inputs 141, 142 from four to three.

The second luminaire 140 is designed to be used with other luminaires of the same type in parallel. So, looking at FIG. 1B, the first power inputs of luminaires 140A, 140B, 140C are electrically connected together and the second power inputs of luminaires 140A, 140B, 140C are electrically connected together. Configurations may support any number of luminaires in parallel depending on the characteristics of the third power supply 123 and the fourth power supply 124 along with the power requirements of the second luminaire 140.

The DC power supplies 121-124, 171A/B, 173A/B may deliver the power delivered to their connected set of luminaires 130A/B/C, 140A/B/C by any appropriate method in response to control by the lighting controller 110. PWM or PDM are examples of how the power delivered can be controlled to a set of luminaires. Examples of technologies for controlling the power delivered to light emitting diodes which may be used with the luminaires 130, 140 are described, for instance, in U.S. Pat. No. 8,299,987, "Modulation Method and Apparatus For Dimming and/or Colour Mixing Utilizing LEDs", which issued on Oct. 30, 2013; U.S. Pat. No. 8,525,446, "Configurable LED Driver/Dimmer for Solid State Lighting Applications", which issued on Sep. 3, 2013; and U.S. Pat. No. 9,942,954, "Method and System for Controlling Solid State Lighting Via Dithering", which issued on Apr. 10, 2018; all of which are expressly incorporated by reference in their entirety herein.

Figure 3A:
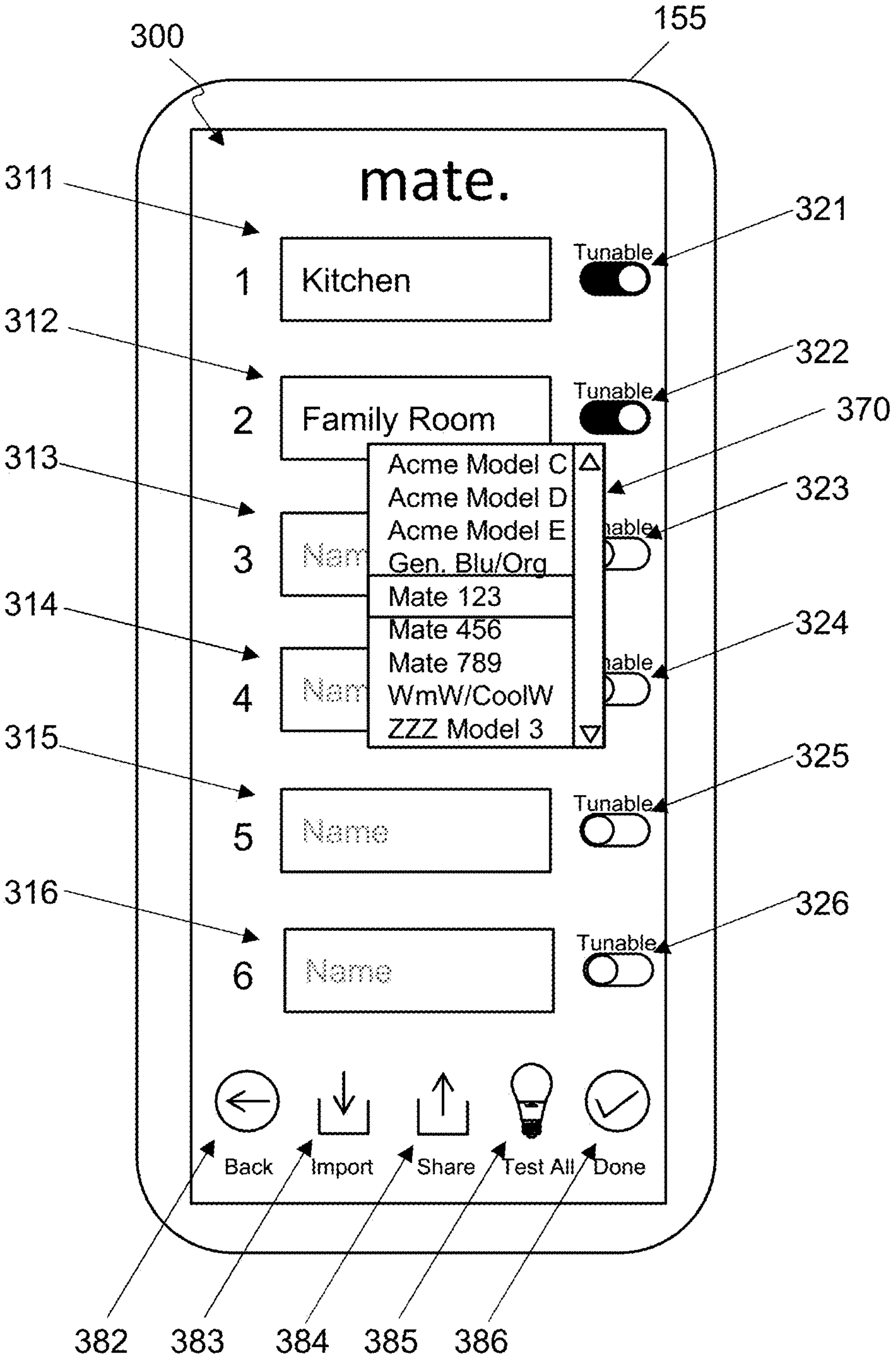
FIGS. 3A, 3B, and 3C depict embodiments of graphical user interfaces on a mobile electronics device suitable for use with the lighting systems of FIGS. 1A, 1B and 1C.

FIG. 3A depicts an embodiment of a graphical user interface (GUI) 300 on a mobile electronics device 155 suitable for use with a lighting systems 100A, 100B, 100C using DC-tunable luminaires. The mobile electronics device 155 may be a smartphone, tablet, mobile computer, or any other type of mobile electronics device. The GUI 300, or an equivalent GUI, may alternatively or additionally be made available on a non-mobile electronics device, such as a desktop computer or kiosk. The GUI 300 may be used to program or configure the lighting controller 110/160 by communicating through its network interface 112/162. The GUI 300 provides a mechanism for a user or installer, such as a technician or electrician, to identify and name the luminaires 130, 140 in the lighting system 100A, 100B, 100C and/or program scenes for the luminaires 130, 140. The GUI 300 includes one or more name fields 311-316 for identifying the luminaires 130, 140 to be controlled, such as the luminaires in a room, a house, an office building, or other structure, for example. In one embodiment, when a user (such as an electrician, an installer, and/or a homeowner) selects one of the name fields 312, the user can enter a user-friendly name for the set of luminaires to be controlled together, such as "Family Room." Selecting the name field 312 or entering a name into the name field 312 may cause the lighting controller 110, 162 to activate the luminaires 140A/B/C associated with that name field, such as be turning on the third and fourth DC power supplies 123, 124 to a known safe value, to allow the user to positively identify the luminaires 140A/B/C being controlled.

The GUI 300 may also include switches 321-326 which can be used to indicate whether the luminaires associated with that name field are tunable, that is that they can have their CCT and/or brightness adjusted. Other embodiments may provide two different switches or a three-position switch to indicate whether just the brightness or both the brightness and CCT can be controlled. In at least one embodiment, activation of the tunable switch 322 brings up another menu 370 to allow the user to identify the type of luminaire associated with that name field 312. The user may scroll through the menu 370 to find the appropriate type identifier of luminaire and then select it within the menu 370 by tapping on the proper type, thus the type identifier of the luminaire may be received from a user. The type identifier may include a model number, a serial number, or a manufacturer. In other embodiments, selecting the tunable switch 322 may initiate an RFID scan to receive information from an RFID tag associated with the luminaire or initiate a QR code scan using a camera of the mobile electronic device 155. In some embodiments a type of the luminaire may be received from the first luminaire over a digital communication link. Once the type of luminaire for a particular name field, the type information may be used to obtain a profile for the luminaires associated with that name field.

In one embodiment, the GUI 300 may include an Import control 383 that may be used to cause the lighting controller 110/160 to import a floor plan, names of sets of luminaires to be controlled, and/or the type(s) of luminaires. The GUI 300 may also include a Share control 384 that may be used to cause the lighting controller 110/160 to export information regarding the settings of the lighting controller 110/160, the luminaires, or other settings. In one embodiment, the Share control 384 may allow a user to export names of luminaires and/or wall switches/dimmers to a label maker or printer to print labels for use in a breaker box and/or the luminaires and/or wall switches/dimmers. The GUI 300 may also include a Test control 385 that may cause the lighting controller 110/160 to automatically verify power and control of the luminaires 130A/B/C, 140A/B/C, such as by causing them to turn on and off or blink. Clicking the Back control 382 may cause the mobile electronics device 155 to return to a previous GUI and clicking on the Done control 386 may exit the app generating the GUI 300. Embodiments of the GUI 300 may also provide mechanisms to identify the number and configuration of luminaires controlled together, such as that there are three luminaires 140A/B/C connected in parallel that are controlled as "Family Room."

Figure 3B:
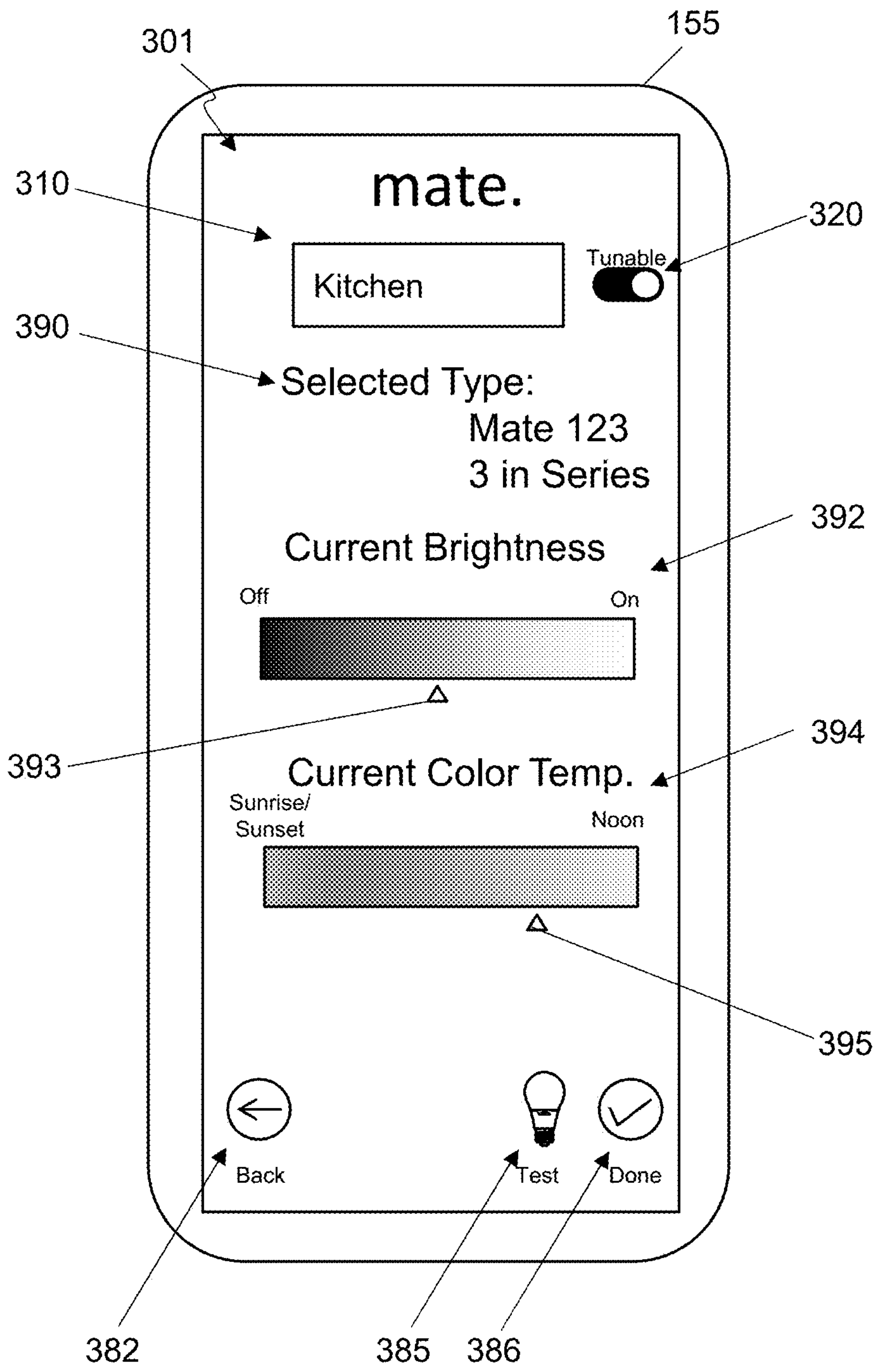

FIG. 3B depicts an embodiment of a GUI 301 on the mobile electronics device 155 suitable for use with a lighting systems 100A, 100B, 100C using DC-tunable luminaires. The mobile electronics device 155 may be a smartphone, tablet, mobile computer, or any other type of mobile electronics device. The GUI 301, or an equivalent GUI, may alternatively or additionally be made available on a non-mobile electronics device, such as a desktop computer or kiosk. The GUI 301 may be used to set brightness and/or the CCT for luminaires controlled by the lighting controller 110/160 by communicating through its network interface 112/162. The GUI 301 includes a name 310 of the group of luminaires 130A/B/C being controlled and a switch/indicator 320 of whether or not those luminaires have tunable CCT and or variable brightness. Information 390 may be provided about the type and/or number and/or configuration of the luminaires 130A/B/C. A Current Brightness section 392 may show the current brightness of the group of luminaires 130A/B/C and a selector 393 may be movable by a user to change the brightness. A Current Color Temperature section 394 may show the current CCT of the group of luminaires 130A/B/C and a selector 395 may be movable by a user to change the CCT. A Test control 385 may cause the luminaires 130A/B/C to blink, move through their range of brightness, and/or move through their range of supported CCT values. Clicking the Back control 382 may cause the mobile electronics device 155 to return to a previous GUI and clicking on the Done control 386 may exit the app generating the GUI 301. Other embodiments may allow different scenes to be configured for this group, such as a starting and/or ending solar event or time of day with associated with a particular CCT and/or brightness.

So, in embodiments, the lighting controller 110 may obtain a target brightness setting for a first luminaire 130 and calculate the first target power and the second target power further based on the target brightness setting and the first profile. The first target power and the second target power are calculated to drive the first luminaire 130 to emit light at the target brightness with the target CCT. The lighting controller 110 may receive a user control for the first luminaire from a user input device, such as a mobile electronic device 155 with a graphical user interface 301, and calculate the first target power and the second target power further based on the user control. The user control may include a brightness setting, an on/off control, or the target CCT.

Figure 3C:
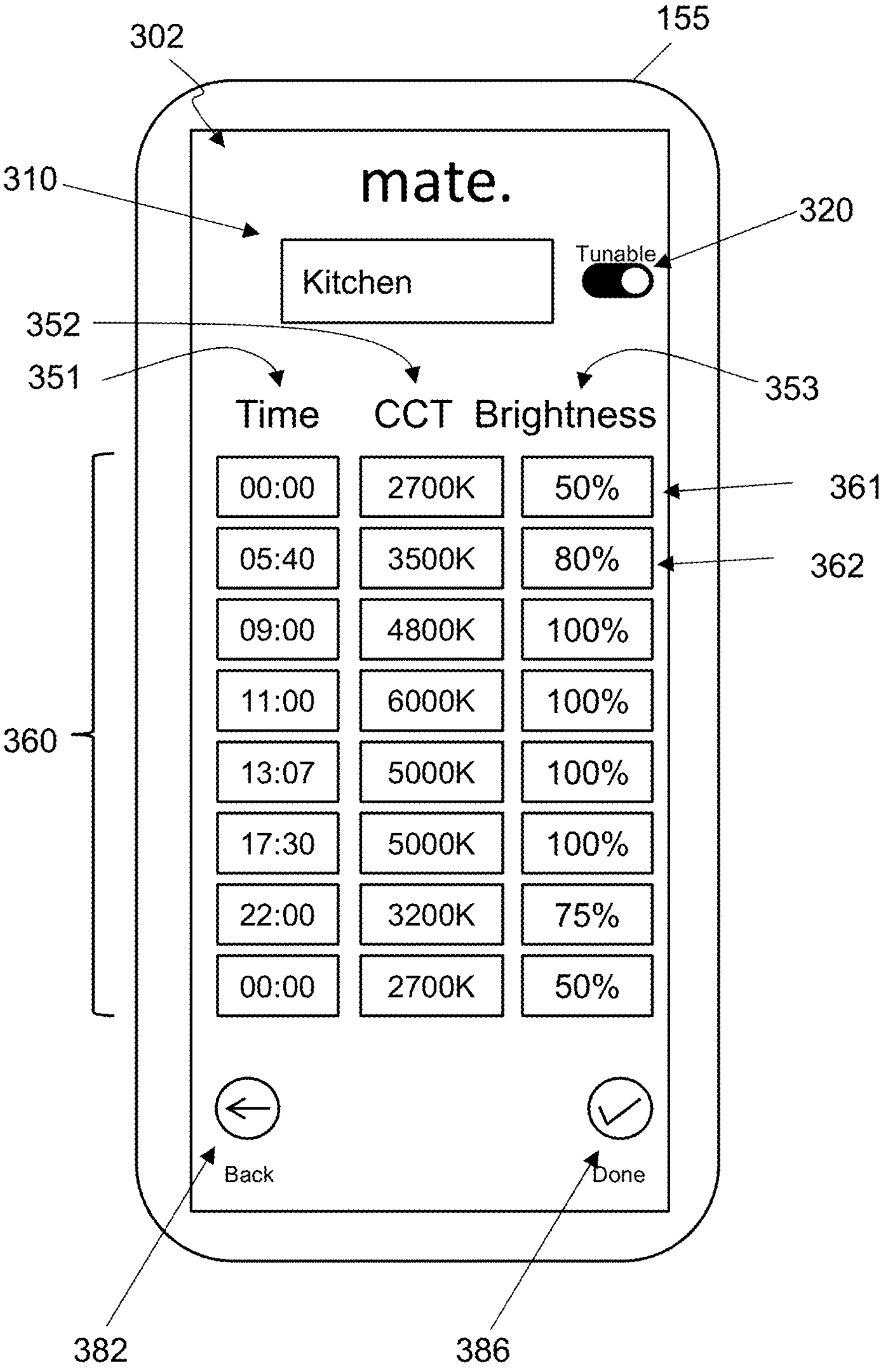

FIG. 3C depicts an embodiment of a GUI 302 on the mobile electronics device 155 suitable for use with a lighting systems 100A, 100B, 100C using DC-tunable luminaires. The mobile electronics device 155 may be a smartphone, tablet, mobile computer, or any other type of mobile electronics device. The GUI 302, or an equivalent GUI, may alternatively or additionally be made available on a non-mobile electronics device, such as a desktop computer or kiosk. The GUI 302 may be used to set a schedule for brightness and/or the CCT for luminaires controlled by the lighting controller 110/160 by communicating through its network interface 112/162. The GUI 302 includes a name 310 of the group of luminaires being controlled and may include a switch/indicator 320 of whether or not those luminaires have tunable CCT and or variable brightness.

The GUI 302 includes entry locations 360 for a user to provide schedule (or modifying an existing schedule) for adjusting the lighting characteristics for the group of luminaires 310 being controlled. In the example shown, the entries 360 include a column for times of day 351, a column for correlated color temperature (CCT) 352 or mired, and a column for brightness 353. The user may adjust the target characteristics for the luminaires of the identified group 310 for a particular time of day be entering the target characteristic and associated time in the entries 360. In the example shown, entries 361 set the Kitchen luminaires to have a CCT of 2700 K and a brightness of 50% at midnight and entries 362 set them to have a CCT of 3500 K and a brightness of 80% at 5:40 AM. So, the target characteristics for the luminaire may include a brightness greater than zero and a correlated color temperature (CCT). Information 390 may be provided about the type and/or number and/or configuration of the luminaires in the GUI 302 or by another GUI (e.g. GUI 301) in some embodiments which can be used to determine how to convert the target characteristics into power supply settings. The information provided by the user in the entries 360 may be used to create a table which is sent to the controller 110/160 by an app running on a mobile electronic device 155. The transition between entries may be determined by the embodiment of the app running on the mobile device 155 and/or the embodiment of the lighting controller 110/160.

Aspects of various embodiments are described with reference to flowchart illustrations and/or block diagrams of methods, apparatus, systems, and computer program products according to various embodiments disclosed herein. It will be understood that various blocks of the flowchart illustrations and/or block diagrams, and combinations of blocks in the flowchart illustrations and/or block diagrams, can be implemented by computer program instructions or by configuration information for a field-programmable gate array (FPGA). These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. Similarly, the configuration information for the FPGA may be provided to the FPGA and configure the FPGA to produce a machine which creates means for implementing the functions/acts specified in the flowchart and/or block diagram block or blocks.

These computer program instructions or FPGA configuration information may be stored in a computer readable medium that can direct a computer, other programmable data processing apparatus, FPGA, or other devices to function in a particular manner, such that the data stored in the computer readable medium produce an article of manufacture including instructions which implement the function/act specified in the flowchart and/or block diagram block or blocks. The computer program instructions or FPGA configuration information may also be loaded onto a computer, FPGA, other programmable data processing apparatus, or other devices to cause a series of operational steps to be performed on the computer, FPGA, other programmable apparatus, or other devices to produce a computer implemented process for implementing the functions/acts specified in the flowchart and/or block diagram block or blocks.

The flowchart and/or block diagrams in the figures help to illustrate the architecture, functionality, and operation of possible implementations of systems, methods, and computer program products of various embodiments. In this regard, each block in the flowchart or block diagrams may represent a module, segment, or portion of code comprising one or more executable instructions, or a block of circuitry, for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 4:
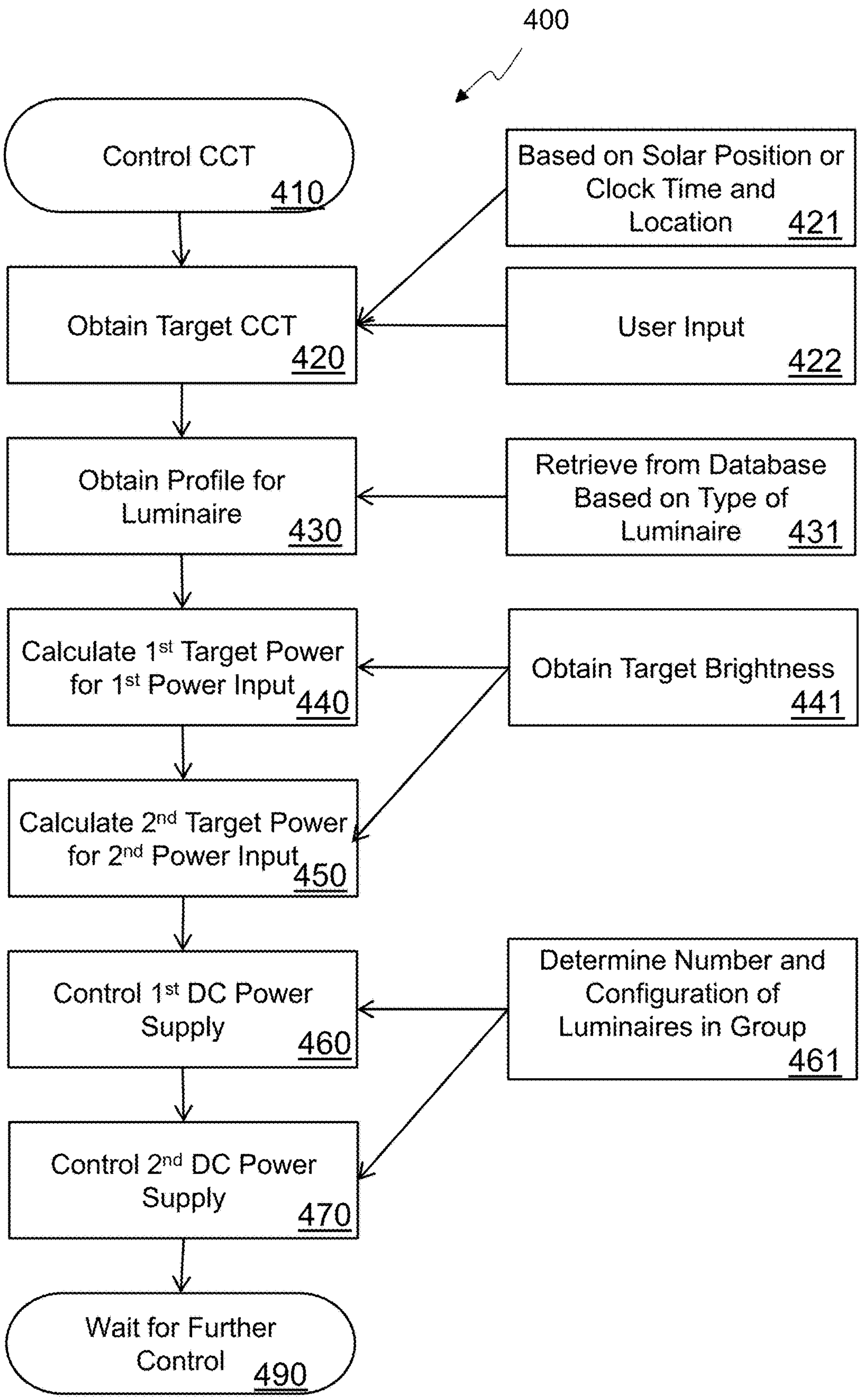
FIG. 4 is a flow chart of an embodiment of a method for controlling a correlated color temperature (CCT) of one or more luminaires.

FIG. 4 is a flow chart 400 of an embodiment of a method for controlling 410 a correlated color temperature (CCT) of one or more luminaires. The method includes obtaining 420 a target CCT for the one or more luminaires. Any appropriate mechanism can be used to obtain a target CCT. In at least one embodiment, a solar position or a clock time for a location of the one or more luminaires is determined and the target CCT is determined 421 based on those parameters. Scenes defined for particular solar events, solar periods, or time periods may be pre-defined to provide a target CCT. In other embodiments a user input is received 422 to set a target CCT.

The method continues with obtaining 430 a first profile associated with a first luminaire of the one or more luminaires. The profile may be obtained by an appropriate method, but in some embodiments a type identifier of the first luminaire is obtained, and the first profile retrieved 431, based on the type identifier of the first luminaire, from a database storing a plurality of profiles. The type identifier may include a model number, a serial number, a manufacturer, information received from the first luminaire over a digital communication link, information from an RFID tag, information from a QR code, and or any other information that can be useful in identifying the luminaire. In some embodiments, the type identifier may be received from a user.

In some embodiments, a target brightness setting may be obtained 441 for the one or more luminaires. The target brightness setting may be obtained along with the CCT from predefined scenes in some embodiments. The target brightness (which may be any brightness value including on or off) may be received as a user control to a user input device such as a wall switch, a wireless remote control, or a mobile electronic device with a graphical user interface.

A first target power for a first DC power input of the first luminaire is calculated 440 and a second target power for a second DC power input of the first luminaire is calculated 450 based on the target CCT and the first profile. The first target power and the second target power are calculated to drive the first luminaire to emit light at the target CCT. In embodiments where brightness is controlled, the first target power and the second target power are calculated 440, 450 further based on the target brightness setting and the first profile with the first target power and the second target power calculated to drive the first luminaire to emit light at the target brightness with the target CCT. In systems where a user control for the first luminaire is received from a user input device, the first target power and the second target power are calculated 440, 450 further based on the user control.

Once the target powers have been calculated, a first DC power supply is controlled 460 by the lighting controller to deliver the first target power to the first DC power input of the first luminaire and a second DC power supply is controlled 470 by the lighting controller to deliver the second target power to the second DC power input of the first luminaire. The DC power supplies can be controlled through communication from the lighting controller to the DC power supplies through a communication channel such as DMX, DALI, Ethernet, or across the internet from a server running software to implement the lighting controller. Once the DC power supplies have been set to deliver the target power, the lighting controller may wait 490 for further control such as another solar event, a predetermined time, or a user input.

In systems controlling multiple groups with different types of luminaires in different groups, the method may also include obtaining a second profile, different than the first profile, for a second luminaire of the one or more luminaires, and calculating a third target power for a first direct-current (DC) power input of the second luminaire and a fourth target power for a second DC power input of the second luminaire based on the target CCT and the second profile, the third target power and the fourth target power calculated to drive the second luminaire to emit light at the target CCT. A third DC power supply is controlled to deliver the third target power to the first DC power input of the second luminaire and a fourth DC power supply is controlled to deliver the fourth target power to the second DC power input of the second luminaire.

Embodiments may determine 461 a number and configuration of luminaires in a group. This may be done by determining that N other luminaires of the one or more luminaires are also associated with the first profile and that a first DC power input and a second DC power input of the N other luminaires are respectively electrically coupled to the first DC power input and the second DC power input of the first luminaire. This may be accomplished automatically using network discover protocols, manually with user input or a combination thereof. The first DC power supply is then controlled to deliver N+1 times the first target power and the second DC power supply controlled to deliver N+1 times the second target power. In such systems, the lighting controller may determine that the first luminaire and the N other luminaires are serially coupled to the first DC power supply and to the second DC power supply and set voltages of the first DC power supply and the second DC power supply based on N. The lighting controller may alternatively determine that the first luminaire and the N other luminaires are coupled in parallel to the first DC power supply and to the second DC power supply and set currents of the first DC power supply and the second DC power supply based on N.

Figure 5:
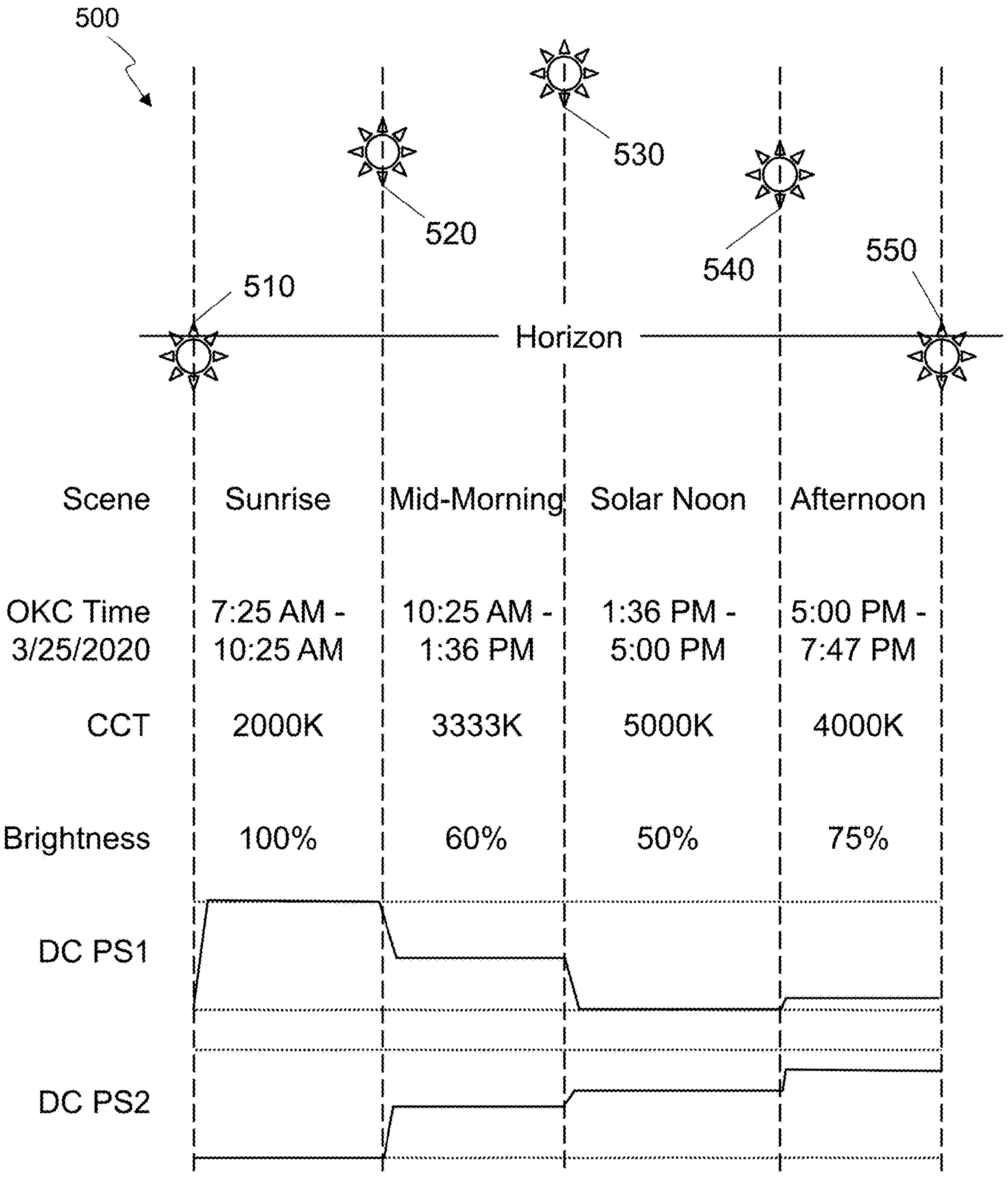
FIG. 5 shows an example behavior of an embodiment of a lighting system through a day.

FIG. 5 shows an example behavior 500 of an embodiment of a lighting system through a day. The lighting system may be any lighting system using elements described herein, such as lighting system 100A of FIG. 1A, lighting system 100B of FIG. 1B, or lighting system 100C of FIG. 1C. But for simplicity, it is assumed that in the lighting system used for the example shown in FIG. 5, there is only a single set of luminaires, all of the same type, connected to a single pair of DC power supplies under control of the lighting controller.

In one embodiment a lighting controller may receive and/or obtain a geographical location of a user, luminaire, or another geographical location, and/or a desired time zone. The geographical location and/or the time zone may be provided by the user, obtained from, or provided by an electronic device associated with the user, and/or based on the geographical location of the lighting controller. In other embodiments, the lighting controller may have a default time zone and be preset with a time using a battery-backed-up clock. The lighting controller may also receive or obtain solar event information indicative of times of occurrence of predetermined solar events for one or more day at the geographical location and/or in the time zone. The solar event information may be obtained from internally stored default times or external databases, one example of which is provided by Sunrise-Sunset.org. Another example of a source of solar event information is the Global Monitoring Division of the Earth System Research Laboratory of the National Oceanic & Atmospheric Administration of the U.S. Department of Commerce. In one embodiment, the lighting controller may calculate the times of occurrence of predetermined solar events for one or more day at the geographical location or in the time zone based on astronomical algorithm, which are known to people having ordinary skill in the art. In one example, the solar events may be calculated for a single longitude in the time zone at the equator for a particular date and used for all locations in that time zone for all dates of the year. The example 500 uses solar event information for Oklahoma City, OK on Mar. 25, 2020, but a similar example could be shown for any location and date. Thus, times shown in example 500 are provided for that date and location in central daylight savings time (CDT).

In the example 500, the lighting controller has been configured to change the lighting at five different times during the day, sunrise 510 (7:25 AM), sunrise plus 3 hours 520 (10:25 AM), solar noon 530 (1:36 PM), 5:00 PM 540, and sunset 550 (7:47 PM). These events are chosen as an example only. Any combination of events may be used in embodiments to change the lighting, including solar events, particular times of day, events detected by sensors, or inputs from a user. Example 500 has five different lighting scenes (or periods), sunrise which starts at 7:25 AM and ends at 10:25 AM, mid-morning which starts at 10:25 AM and ends at 1:36 PM, solar noon which starts at 1:36 PM and ends at 5:00 PM, afternoon, which starts at 5:00 PM and ends at 7:47 PM, and night (not shown) which includes 12:00 AM-7:25 AM and 7:47 PM through the end of the day (12:00 AM, Mar. 26, 2020).

The lighting controller may have been previously programmed with assigned settings indicative of scenes which may vary the CCT and brightness for each lighting period. Embodiments may set a CCT and/or brightness for the lighting based on scenes or simply upon events. The lighting controller may have a default setting which is used when a time period assigned to a scene ends and no new setting has been provided, such as being set to off. In other embodiments, the lighting controller may be configured to change the CCT and/or brightness in response to an event, such as sunrise for that particular date, or an input from a sensor, and to leave the CCT/brightness at that level until a new event is detected. In another embodiment, the predefined scenes may set a CCT/brightness to be used another device such as switch or remote control turns on a luminaire, but the predefined scenes may not be used to actually turn a luminaire on if it has been set to be off by the other device. In the example shown the periods each have a defined CCT and brightness setting, with night being off (0% brightness) with no change to the CCT, sunrise being 100% brightness with a CCT value of 2000K, mid-morning being 60% brightness with a CCT value of 3333K, solar noon being 50% brightness with a CCT value of 5000K, and afternoon being 75% brightness with a CCT value of 4000K.

The lighting controller can then detect the events that have been programmed or use a current clock time to see that the next period has been entered and compute power levels for the two DC power supplies driving the luminaires, based on the target brightness/CCT settings and the profile for the luminaires, to set the brightness and CCT of the light emitted by the luminaires to meet the targets. For example 500, the profile for the luminaire may provide a drive type (voltage for CV drive, current for CC drive) for each of its two DC power inputs (which may be an encoded 8 bit value for each selecting one of 256 standard settings in this example) and then provide a two dimensional matrix of 8 bit values (representing a linear percentage of maximum power with '00000000' being 0% and '11111111' being 100%) for each of the two power supplies with one dimension of the matrix being brightness at 5% steps from 0% to 100% and the other dimension being CCT at 250K steps from 2000K to 5000K.

The profile can provide the information about the luminaire in any way, and at any quantization, depending on the embodiment. In the example given, the profile would be a 21×13×16 bit matrix plus two bytes identifying the drive type for a total of 548 bytes. Other embodiments may provide more or less information by changing the quantization (i.e. step size) of the CCT and/or the brightness to change the size of the matrix and/or change the size of the data value for each power supply setting (i.e. a quantization of the power supply setting). For example, another embodiment may change the brightness step size to 10%, reducing the matrix size to 11×13 and use 4 bits to represent the percentage of power for each power supply, reducing the profile size to 145 bytes. Some embodiments may compress the profile using a lossless compression scheme to reduce the amount of storage needed for each profile. Other embodiments may provide equations, such as by providing coefficients for 7 pairs of 5th-degree polynomials corresponding to 7 different CCT values which take the target brightness as their input and generate a power output for a DC power supply, coefficients for a different predefined set of equations each corresponding to a particular brightness value that takes a CCT value as its input and computes power levels, or a symbolic representation of a pair of equations that directly compute the power values based on the CCT and brightness targets. Other embodiments may use provide different representations of how to compute target power levels based on target CCT and/or brightness levels.

So, in example 500, the lighting controller determines that the time of the sunrise has occurred and computes a power setting for the first and second DC power supplies to cause the luminaires to generate 100% brightness at a CCT of 2000K for the sunrise scene. It retrieves the profile and looks up the power settings for those targets and may find that the first DC power supply should be set to 100% and second DC power supply should be set to 0%. At three hours after sunrise, the lighting controller accesses the profile to determine settings for a 60% brightness with a CCT value of 3333K for the mid-morning scene, but the profile of this example only has settings for (60%, 3250K) and (60%, 3500 K). In some embodiments, the closest settings may be selected and used, such as the 50% setting for each power supply shown. In other embodiments, the power supply settings may be interpolated between the two surrounding settings. So, for example if the profile value for the first power supply is 50% for (60%, 3250K) and 55% for (60%, 3500 K), an interpolated value of 51.7% may be calculated for the first power supply.

For each scene setting the two DC power supplies are calculated, so that for the solar noon scene the first power is set to 0% and the second power supply is set to 62% and for the afternoon scene, the first power supply is set to 12% and the second power supply is set to 82%. For the night scene, the luminaires are set to off so both power supplies are set to 0%. Note that the profile information and power levels provided for example 500 may or may not correspond to any actual luminaire but are used for example purposes only. A profile for a particular luminaire may be provided by the manufacturer of the luminaire or generated by a third party by taking measurements of one or more luminaires to determine the profile.

The lighting controller may then transmit signals to the DC power supplies to regulate electrical power sent to first power inputs and second power inputs of the luminaires in the system to produce light from luminaires at the CCT and/or level of brightness assigned to specific solar events or periods at the times of occurrence of the predetermined solar events based on the solar event information. The transition between CCT and/or brightness levels may occur in a single step or may transition over a period of time, depending on the embodiment. The transition may be managed by the lighting controller calculating changing values over a transition period and gradually changing the settings in the DC power supplies. In other embodiments, the DC power supplies may have the ability to ramp the changes themselves.

FIG. 6A shows a block diagram of an alternative embodiment of a lighting system 600 using an alternative embodiment of a lighting controller 610. The controller 610 includes a clock 620 to provide a time of day, which may be a real-time clock 620 with battery backup 621 to keep an accurate time of day even if the lighting controller 610 loses its overall power connection. In some embodiments, the clock 620 may be preset for a particular time zone, but in other embodiments, the system 600 may include a user input device to provide a time zone for the real-time clock 620. The user input device can be provided by an external device, such as a smartphone in communication with the lighting controller 610, but in the example shown, the user input device is a physical selector switch 615 with settings for each of the 4 major US time zones, Eastern, Central, Mountain, and Pacific, as well as a Test setting "T" to indicate that the lighting controller should use constant default values for the power supply settings which may be useful during installation and inspection/testing of the system 600.

The controller 610 also includes a settings calculator 640A, coupled to the clock 620, to determine power supply settings 633A for two or more power supplies 681, 685 based on the time of day. The power supply settings 633A are based on target characteristics for a luminaire 690 having a first light emitter powered by a first direct current (DC) power supply 681 of the two or more power supplies and a second light emitter powered by a second DC power supply 685 of the two or more power supplies. The target characteristics for the luminaire 690 may include a brightness greater than zero and a correlated color temperature (CCT). The luminaire 690 may be coupled to a first leg 691 of an output of the first power supply 681 and the first leg 695 of an output of the second power supply 685. The second legs of the power supplies 681, 685 may be connected together and coupled to one side of a single-pole, single throw switch 699 which is connected to the luminaire 690 to allow an ON/OFF state of the luminaire 690 to be controlled. In some cases, a positive output leg of each power supply 681, 685 may be commonly connected to the switch 699 and in other cases, a negative output leg of each power supply 681, 685 may be commonly connected to the switch 699. In some embodiments controller 610 includes the first power DC power supply 681 and the second DC power supply 685 in a single integrated device.

The lighting controller 610 also includes a power supply control interface 630 configured to send the power supply settings 633A to the two or more power supplies 681, 685 independent of an ON/OFF state of the luminaire 690. The power supply settings 633A may be sent over a communication link 638 which may be any applicable type of link but may a serial interface using a protocol compliant with Digital Multiplex (DMX) standards to communicate with the two or more DC power supplies 681, 685 in some embodiments. The serial interface may use a daisy-chained topology where the power supply control interface 630 of the lighting controller 610 communicates with the interface 683 of the first DC power supply 681 over link 638 and the interface 681 repeats the DMX information on the link 639 to the interface 687 of the second DC power supply 685. The power supply control interface 630 may be configured to periodically send a current set of power supply settings 633A to the two or more power supplies 681, 685 that are redetermined by the settings calculator 640A as the time of day changes.

The settings calculator 640A includes circuitry 650A to access a table 665A residing in memory 660A based on the time of day. Information retrieved from the table 665A can be used to determine the power supply settings 633A. The circuitry 650A can be any type of circuitry, including, but not limited to, a microprocessor, an FPGA, an ASIC, or discrete circuitry. In some implementations, the controller 610 includes a socket (e.g. a USB connector or an SD Card slot) for a user-replaceable memory device that can be used as the memory 660A of the settings controller. The settings calculator 660A may be configured to use constant default values or a default set of power supply settings for the power supply settings 633A upon determining that no information to determine the power supply settings 633A can be retrieved through the socket.

In an embodiment, the settings calculator circuitry 650A may access the table 665A to determine the next time to change the power supply settings 633A and then continue to monitor the clock 620 until that time occurs. It may alternatively set up the clock 620 to indicate to the circuitry 650A that the time has arrived (e.g. through use of an interrupt). Once the time has arrived, the circuitry 650A may access the table 665A to obtain the information to determine the power supply settings 633A for that time. In some cases, the information may include CCT and brightness information that can be used to calculate the power supply settings 633A, but in other cases, the information retrieved from the table 665A may be the power supply settings 633A themselves. The power supply settings 633A are then sent from the settings calculator 640A through the power supply control interface 630 to the one or more power supplies 681, 685.

Figure 6B:
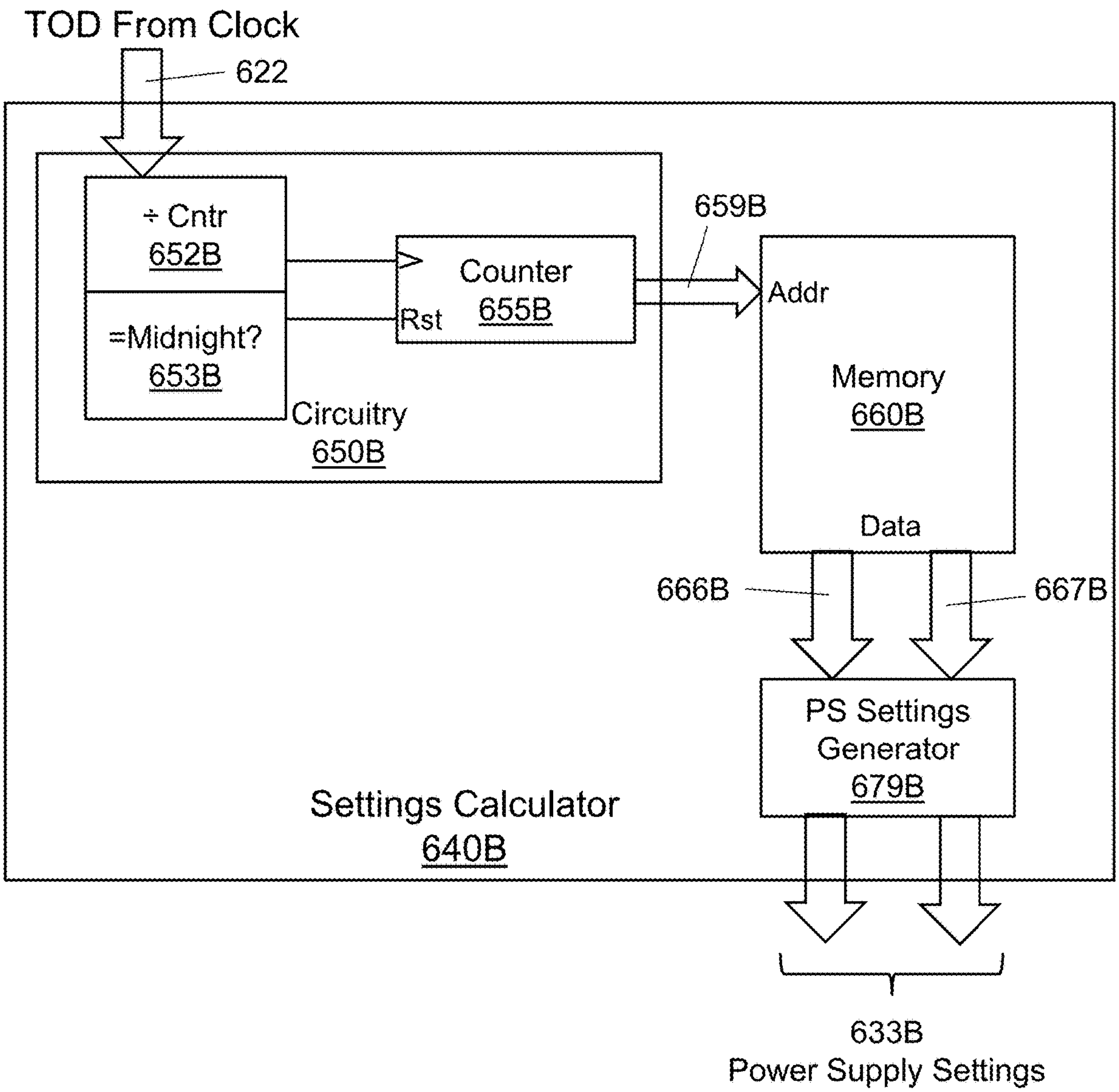
FIG. 6B shows a block diagram of an embodiment of a settings calculator for use in a lighting controller.

FIG. 6B shows a block diagram of an embodiment of settings calculator 640B for use in a lighting controller 610. The settings calculator 640B includes a memory device 660B and circuitry 650B to retrieve information 666B, 667B from the memory device 660B based on the time of day and use the information 666B, 667B in the power supply settings generator 679B to generate a set of power supply settings 633B. In some cases, the power supply settings 633B are directly stored in the memory 660B so the power supply generator 679B simply passes the information 666B, 667B from the memory 660B out as the power supply settings 633B. In other implementations, the lighting characteristics (e.g. CCT and brightness) are retrieved from the memory 660B as the information 66B, 667B and they are then used by the power supply generator 679B, using a profile of an attached luminaire or default equations, to calculate the power supply settings 633B. The details of the information 666B, 667B and the power supply settings 633B may vary according to the implementation. In at least one embodiment, the information 666B and the information 667B each include an 8-bit DMX address and an 8-bit DMX value which are directly passed to the power supply control interface 630 as the power supply settings 633B. The power supply control interface 630 can then use the DMX addresses to determine where in the DMX signal to place the associated DMX values. Thus, the memory 660B may store a table of sets of power supply settings associated with corresponding times of day, and the information 666B, 667B used to determine the power supply settings includes the set of power supply settings 633B associated with the time of day. The memory device 660B may be user-replaceable in some embodiments.

The settings calculator 640B includes circuitry 650B configured to periodically access the memory 660B so that the time of day associated with the information stored in the memory 660B is implicitly determined based on the address 659B. The circuitry 650B receives time-of-day information 622 from the clock 620 and uses a divide-by-counter 652B to divide the time-of-day information 622 by a predetermined value to increment an address counter 655B which generates the address 659B for the memory 660B. In one example, the clock information 622 may include a pulse 32768 times per second along with a current time. The memory 660B stores a table of information associated with corresponding times of day with one entry for each power supply to be controlled for a predetermined period, such as, but not limited to, a minute, 15 minutes, or one hour. So, for example, if the memory stores 1440 sets of information (one per minute of a 24-hour day), the divide-by-counter 652B, may increment the address counter 655B once every 47,185, 920 pulses (32768×1440) in the clock information 622 to update the address sent to the memory 660B. The memory 660B then retrieves the information 666B, 667B and the power supply settings generator 679B generates the power supply settings 633B for the current time of day to sent to the power supplies. The circuitry 650B also includes a comparator 653B to determine when midnight occurs. The address counter 655B may be reset at midnight to restart the sequence of lighting characteristics.

Thus, the circuitry 679B of the settings calculator 640B may be configured to periodically retrieve updated information 666B, 667B from the memory device 660B based on the time of day and generate an updated set of power supply settings 633B based on the updated information 666B, 667B as the time of day changes. The power supply control interface 630 is configured to periodically send the updated set of power supply settings 633B to the two or more power supplies 681, 685 independent of the ON/OFF state of the luminaire 690. In some embodiments, the information 666B, 667B is stored in a table that has at least 96 entries, and a period for repeating said retrieving, generating, and sending is no greater than 15 minutes. In some embodiments, the information 666B, 667B is stored in a table that has at least 1440 entries, and a period for repeating said retrieving, generating, and sending is no greater than 1 minute.

Figure 6C:
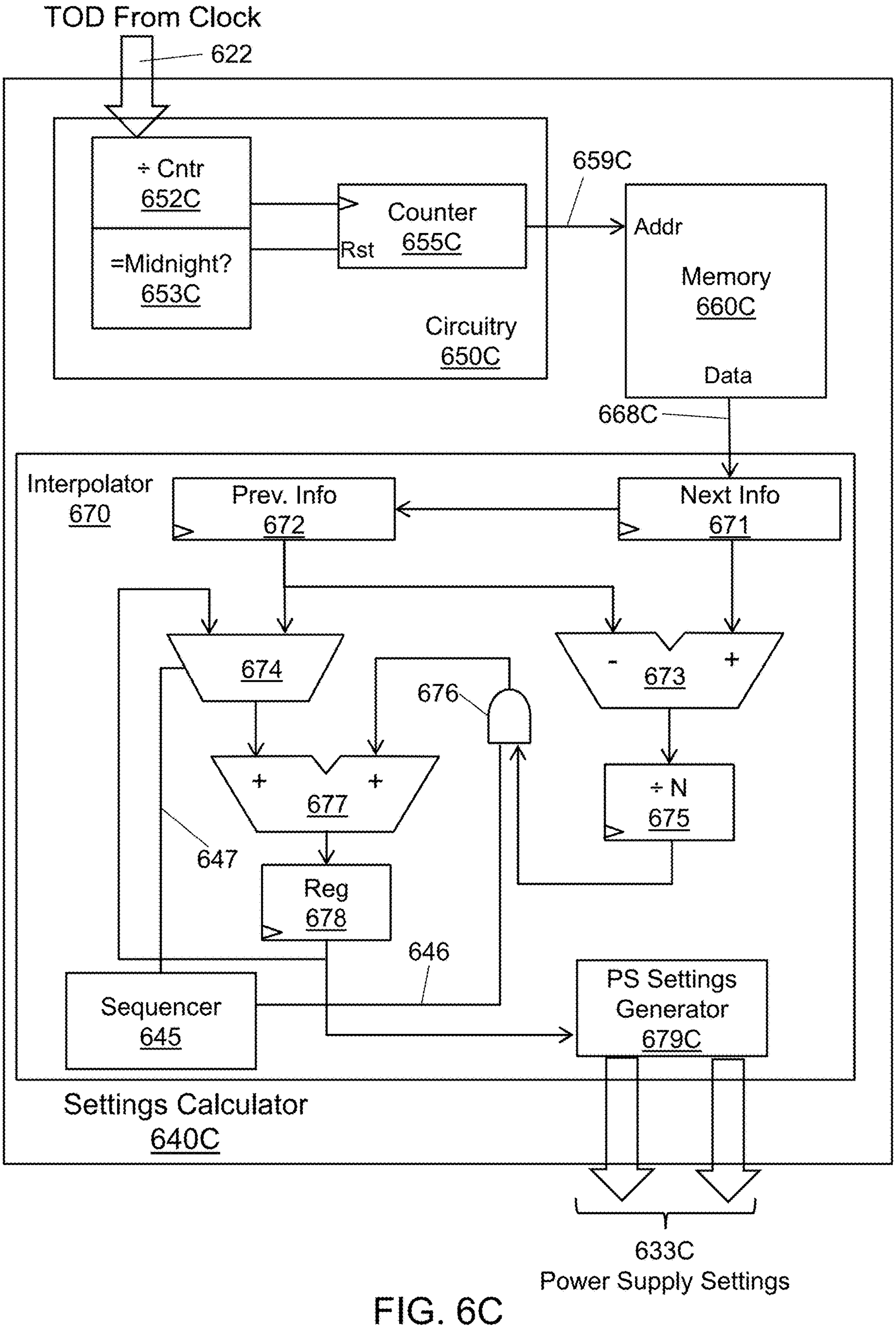
FIG. 6C shows a block diagram of an alternative embodiment of a settings calculator for use in a lighting controller.

FIG. 6C shows a block diagram of an alternative embodiment of a settings calculator 640C for use in a lighting controller 610. The settings calculator includes circuitry 650C, to receive time of day information 622 from the clock 620, use a divide-by-counter 652C to increment an address counter 655C that generates an address 659C based on a time of day and reset the address counter 655C based on a comparator 653C that determines when the time-of-day information 622 indicates midnight. The circuitry 650C may operate identically to the circuitry 650B shown in FIG. 6B.

The settings calculator 640C also includes an interpolator 670 that receives the information 668C retrieved from the memory device 660C storing a table of information associated with corresponding times of day and generates the power supply settings 633C. While one interpolator 670 is shown, multiple sets of interpolator circuitry may be included to interpolate multiple values retrieved from memory 660C. First information associated with a time earlier than the time of day that was previously retrieved from memory 660C is stored in the previous information register 672 and second information associated with a time no earlier than the time of day is retrieved from the table of information in the memory 660C and stored in the next information register 671.

An interpolator 670 can then calculate an interpolated set of power supply settings 633C based on both the first information stored in the previous information register 672 and the second information stored in the next information register 671. So, the power supply settings 633C for the two or more power supplies 681, 685 sent by the power supply control interface 630 include the interpolated set of power supply settings 633C. The interpolator 670 may operated by calculating a difference between the first information stored in the previous information register 672 and the second information stored in the next information register 671 using a subtraction circuit 673 and dividing the difference by the number of interpolation steps that will be generated at divider 675 to generate the increment value to use for the interpolation. So as one example, the table of information stored in memory 660C may have 24 or fewer entries for a 24-hour period and the settings calculator 640C may be configured to recalculate the interpolated set of power supply settings at least every 15 minutes. So, if the table in memory 660C has 24 entries (one per 60-minute period), the difference generated by the subtraction circuitry 673 is divided by 4 (60 minutes divided by 15 minutes), so the divider 675 simply shifts the difference right by two bits. In another example, the table of information may have 10 or fewer entries and the settings calculator 640C may be configured to recalculate the interpolated set of power supply settings at least once every minute. So, if the table in memory holds 8 entries (providing a new target value every 3 hours) and power supply settings 633C are updated 256 times per period (every 1,382,400 ticks of the 32,786 Hz clock or about every 42.2 seconds), the divider 675 can shift the difference 8 bits to the right, keeping all the bits intact for further arithmetic operations. This ensures that the most an interpolated value can vary from one value to the next is about 0.4% of the maximum value.

The interpolator 670 includes a sequencer 645 to control the interpolation process. For the first value sent after a next information register 671 is loaded from memory 660C and the previous information register 672 is loaded with the data previously held in the next information register 671, the sequencer 645 controls the mux 674 to select the data from the previous information register 672 and controls AND gates 676 to output a zero so that the adder 677 simply passed the value from the previous information register 672 to the interpolated value register 678. For each interpolation cycle after that until the number of interpolation steps has been completed, the sequencer 645 controls the mux 674 to select the value from the interpolated value register 678 and the AND gates to pass the increment value from the divider 675 so that the adder 677 adds the increment value to the pervious interpolated value and stores the new interpolated value in the interpolated value register 678. The output of the interpolated value register 678 is used by the power supply settings generator 679C to generate the power supply settings 633C to send to the two or more power supplies 681, 685.

Using an interpolator 670 may allow the settings calculator to recalculate the interpolated set of power supply settings periodically and to ensure that any two consecutive interpolated power supply settings have a difference of less than 1% of the maximum value and/or any two consecutive interpolated power supply settings cause an imperceptible difference in a light output of the luminaire powered by the two or more power supplies, which may be, for example, a difference of less than 50K in a correlated color temperature (CCT) of light from the luminaire powered by the two or more power supplies.

Figure 7A:
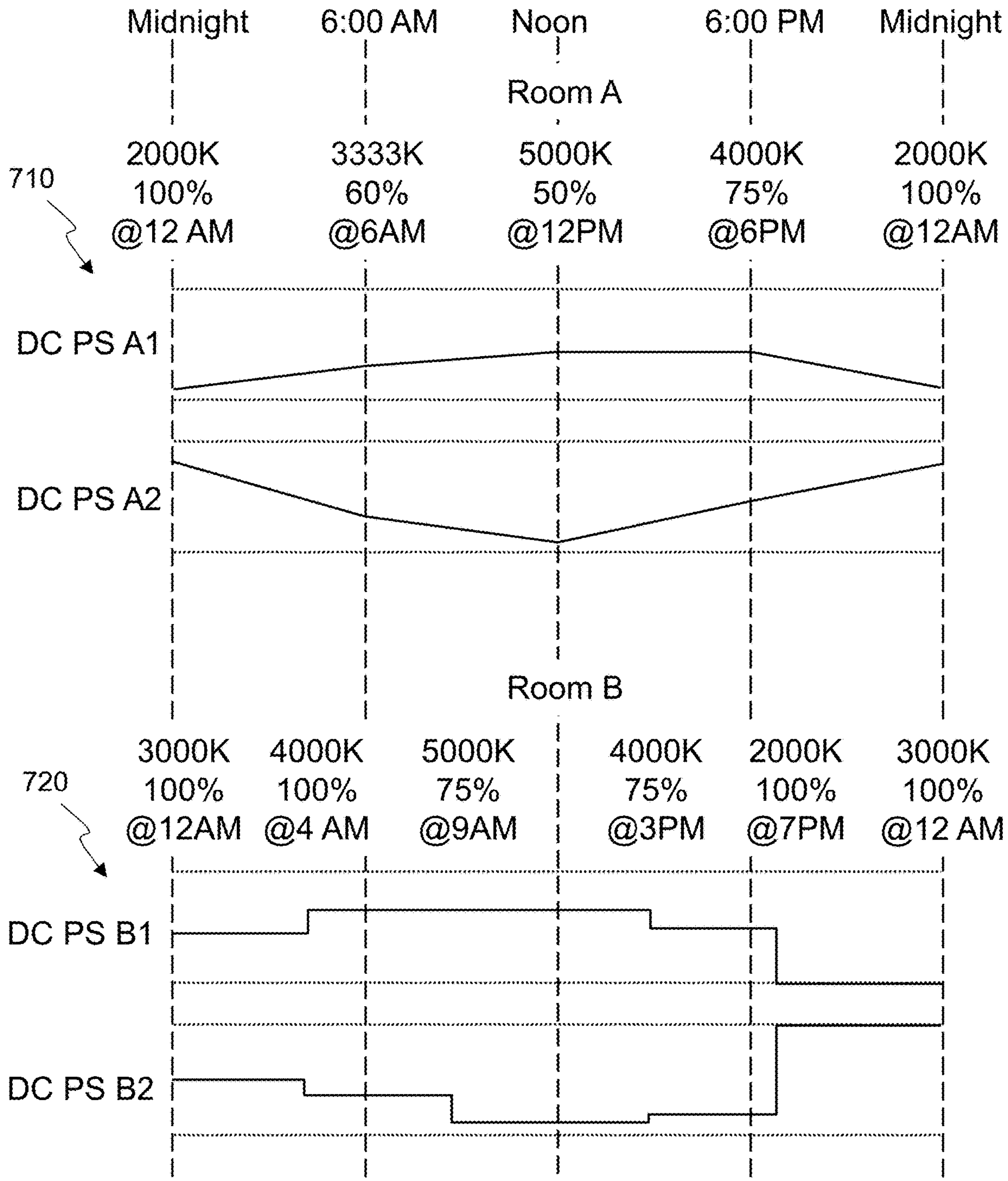
FIGS. 7A and 7B show power supply output levels for several examples that could be generated from embodiments.
Figure 7B:
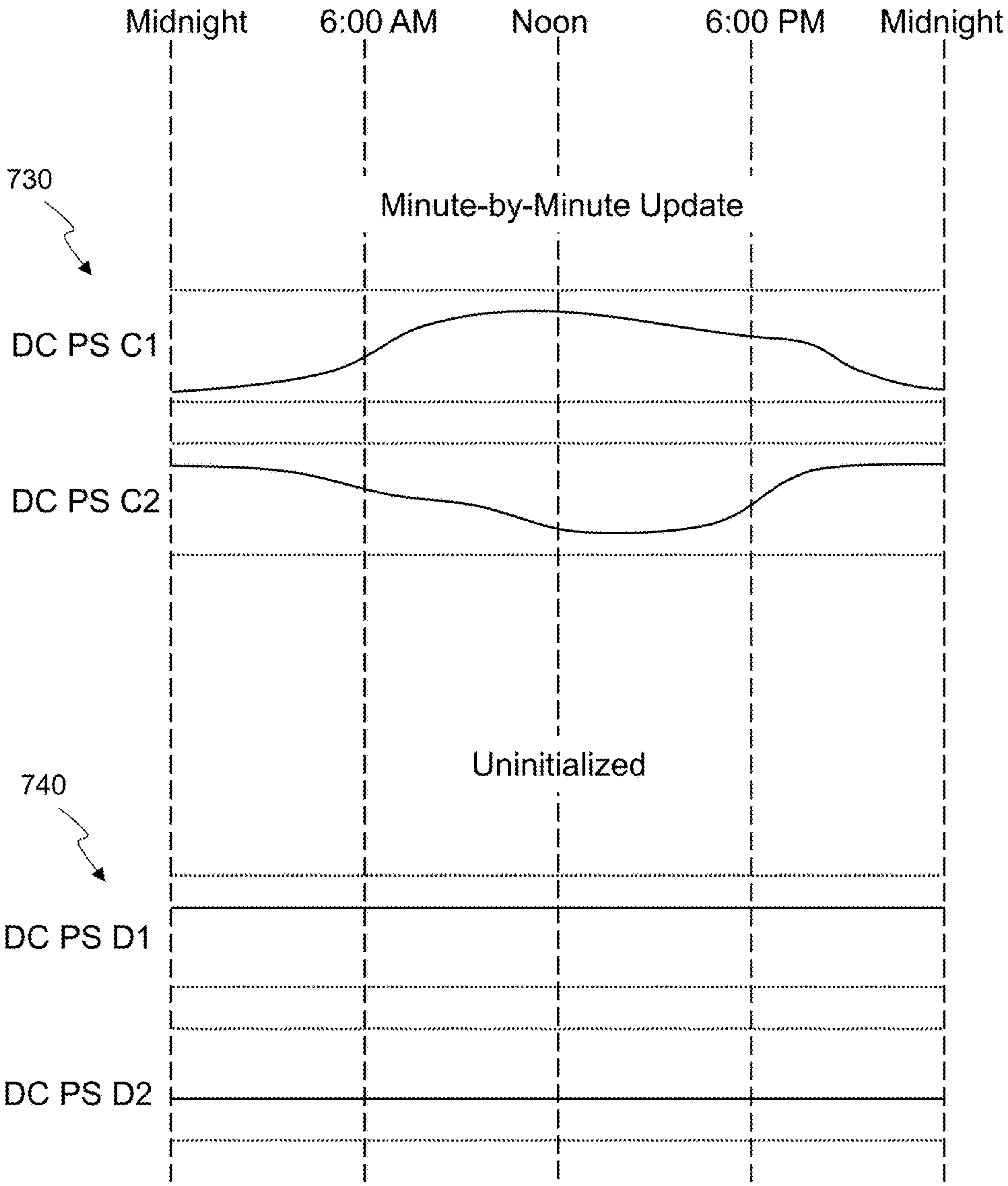

FIGS. 7A and 7B show power supply output levels for several examples that could be generated from embodiments. FIG. 7A shows power supply output levels 710 for a first DC power supply A1 and a second DC power supply A2 generated based on power supply settings sent from a lighting controller for a first room A based on a set of lighting parameters associated with various times of day. It also shows power supply output levels 720 for a third DC power supply B1 and a fourth DC power supply B2 generated based on power supply settings sent from a lighting controller for a second room B based on a set of lighting parameters associated with various times of day.

Referring now to the power supply output levels 710, four sets of lighting parameters are shown, 2000 K/1100% @ 12 AM, 3333 K/160% @ 6 AM, 5000K/50% at 12 PM, 4000 K/175% @ 6 PM, and then starting a repeat of the 24-hour period with 2000K/100% @ 12 AM of the next day. Because the settings are evenly distributed at 6-hour intervals, they may be stored in table with an implicit assumption to their timing. A profile of an attached luminaire may be used to convert the lighting parameters into power supply settings which are then sent to the first set of two or more power supplies, DC power supply A1 and DC power supply A2. Alternatively, instead of storing the lighting parameters, the actual power supply settings for those lighting parameters may be stored. For purposes of this example, 2000K/100% can be generated from the luminaire with a setting for DC power supply A1 of about 10% and a setting for DC power supply A2 of 80%. In this example, the lighting controller interpolates between values, so the next set of lighting parameters (3333K/60% @ 6 AM) are retrieved and power supply settings of 25%/25% are calculated and an interpolation from 10%/80% to 25%/25% is started and the interpolated power supply settings calculated and sent from the lighting controller to the two DC power supplies periodically.

At 6 AM, the 25%/25% power supply settings generated from the 3333K/60% lighting parameters are sent to the two DC power supplies and the next set of lighting parameters (5000K/50%) associated with 12 PM are retrieved and the power supply settings (50%/10%) for those parameters are calculated and an interpolation over the period of 6 AM to 12 PM is started. This is repeated for each set of lighting parameters and repeated for each day (or week or whatever period is used for the repeat cycle).

Through the use of interpolation, any two consecutive updated sets of power supply settings may have a difference of less than 1% of the maximum value. Any two consecutive updated sets of power supply settings may cause an imperceptible difference in a light output of the luminaire powered by the two or more power supplies. Any two consecutive updated sets of power supply settings in the table may cause a difference of less than 50K in a correlated color temperature (CCT) of light from the luminaire powered by the two or more power supplies. By using interpolation, fewer sets of information may need be stored to achieve smooth transitions for the lighting. As a non-limiting example, some embodiments may achieve smooth results using a table that has 24 or fewer entries and a period for recalculating and sending a power supply setting is no greater than 15 minutes. In another embodiment, smooth results may be generated using a table that has 10 or fewer entries and a period no greater than 1 minute.

Referring now to the power supply output levels 720, five sets of lighting parameters are shown, 3000 K/100% @ 12 AM, 4000 K/100% @ 4 AM, 5000 K/75% at 9 AM, 4000 K/75% @ 3 PM, 2000 K/100% at 7 PM, and then starting a repeat of the 24-hour period with 3000 K/100% @ 12 AM of the next day. Because the settings are not evenly distributed though the day, they may be stored in table with an explicit start time which is retrieved and used to determine when to change the power supply settings. A profile of an attached luminaire may be used to convert the lighting parameters into power supply settings which are then sent to the first set of two or more power supplies, DC power supply B1 and DC power supply B2. Alternatively, instead of storing the lighting parameters, the actual power supply settings for those lighting parameters may be stored. For purposes of this example, 3000 K/100% can be generated from the luminaire with a setting for DC power supply B1 of about 50% and a setting for DC power supply B2 of 50%. In this example, the lighting controller does not interpolate between values so those power supply settings remain in place (or are repeatedly sent periodically) until 4 AM when the next set of lighting parameters (4000 K/100%) are retrieved and power supply settings of 65%/30% are calculated and sent to the two DC power supplies. This continues at for each set of information in the table until the cycle repeats again at midnight. Note that while only 5 periods are shown for the power supply levels 720, any number of sets of information may be stored either with explicit times or implicitly associated with times based on a predetermined period. So, if enough sets of information are stored, the lighting parameters may be changed smoothly. In some cases, the information is stored in a table that has at least 96 entries, and a period for updating the power supply settings is no greater than 15 minutes.

FIG. 7B shows power supply output levels 730 for a DC power supply C1 and a DC power supply C2 generated based on power supply settings sent from a lighting controller for a third room C based on information stored in a table in a memory that is associated with various times of day. It also shows power supply output levels 740 for a DC power supply D1 and a DC power supply D2 sent from a lighting controller that has not yet been initialized or is set to send constant default power supply settings.

Referring now to the power supply output levels 730, a table may have 1440 sets of power supply settings, one for each minute of a day. Every minute, a new set of power supply settings is retrieved from the table and sent to the two DC power supplies C1/C2. This can allow for nearly arbitrary changes in the lighting characteristics of the luminaire during a 24-hour period. So, in at least one embodiment information is stored in a table that has at least 1440 entries, and a period for repeating sending the power supply settings is no greater than 1 minute. As such, any two consecutive power supply settings may have a difference of less than 1% of the maximum value and/or cause an imperceptible difference in a light output of the luminaire powered by the two or more power supplies, such as causing a difference of less than 50K in a correlated color temperature (CCT) of light from the luminaire powered by the two or more power supplies.

Referring now to the power supply output levels 740, in some embodiments, if the lighting controller has not yet been initialized, or if the lighting controller is set to an installation/test mode, the lighting controller may use a predetermined set of power supply settings the correspond to a fixed lighting configuration for the luminaire. The predetermined set of power supply settings may be sent periodically to the two or more power supplies. Using the predetermined set of power supply settings allows for installation/testing/inspection without any question as to what the brightness or CCT of the luminaires is set for. Once the lighting controller has been initialized and/or set for normal operation, it may start updating the power supply settings for the human-centric lighting.

Figure 8A:
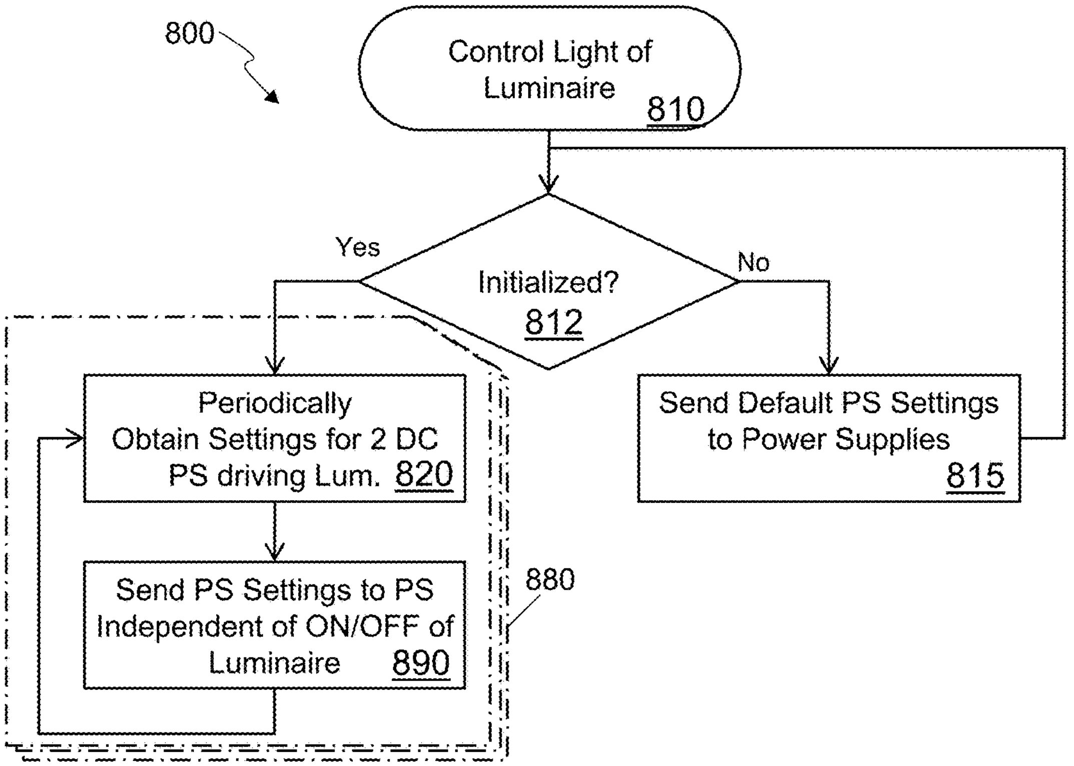
FIGS. 8A, 8B, and 8C show flow charts of aspects of an embodiment of a method for controlling a light characteristic of luminaire.

FIG. 8A shows a flow chart 800 of aspects of an embodiment of a method for controlling 810 a light characteristic of a luminaire. The method may be implemented in one of the lighting controllers and/or lighting systems described herein, and/or may be implemented by software running on another device in communication with power supplies powering tunable luminaires. The method may check to see if the lighting controller has been initialized 812. Initialization may be determined by any method, including checking a user input on the lighting controller itself (e.g. the user input device 615 in FIG. 6A), by checking to see if an initialization flag in the lighting controller has been set (which may have been set by an external device through a network interface, by local software accessing external resources through the network interface, or by other mechanisms), by checking to see if a table in memory has been initialized, by checking to see if a time zone or time-of-day for a clock has been set, or by any other mechanism. If the lighting controller has not yet been initialized, the lighting controller may send 815 default power supply settings to one or more power supplies powering one or more tunable luminaires. The lighting controller can periodically check 812 to see if it has been initialized and continue to periodically send 815 default power supply settings until it has been initialized. So, in at least one embodiment, the lighting controller will use constant default values for the power supply settings until an input to set a local time is received.

Once it has been detected that the lighting controller has been initialized 812, the lighting controller periodically obtains settings 820 for two or more DC power supplies driving one or more tunable luminaires and sends 890 the power supply settings to the power supplies independent of an ON/OFF state of the luminaire(s). Thus, the power supply settings are sent no matter if a switch between the power supplies and the luminaire(s) is on or off. The periodic obtaining of the power supply settings 820 and sending 890 the power supply settings to the power supplies may continue indefinitely or until explicitly disabled and may repeat at any frequency, depending on the embodiment.

In some embodiments, the lighting controller may obtain settings for multiple different sets of power supplies 880 and independently periodically obtain settings 820 for two or more DC power supplies driving one or more tunable luminaires for each set and independently send 890 the power supply settings to the power supplies independent of an ON/OFF state of the luminaire(s). The different sets of power supplies and attached luminaire(s) may be assigned to different rooms or different lighting circuits in a single room.

The methods shown by flowchart 800 may include periodically obtaining a current set of power supply settings, such as by reading them from a table in memory and sending the current set of power supply settings to the two or more power supplies. The power supply settings may be sent using any type of communication interface and protocol, but some embodiments may use a protocol compliant with Digital Multiplex (DMX) standards to communicate with the two or more power supplies. In some cases, the method of flowchart 800 may include communicating over a network interface to receive information to set the time of day which may signify that the lighting controller has been initialized 812 and constant default values for the power supply settings may be used (i.e. sent 815 to the power supplies) until the time of day has been set.

Figure 8B:
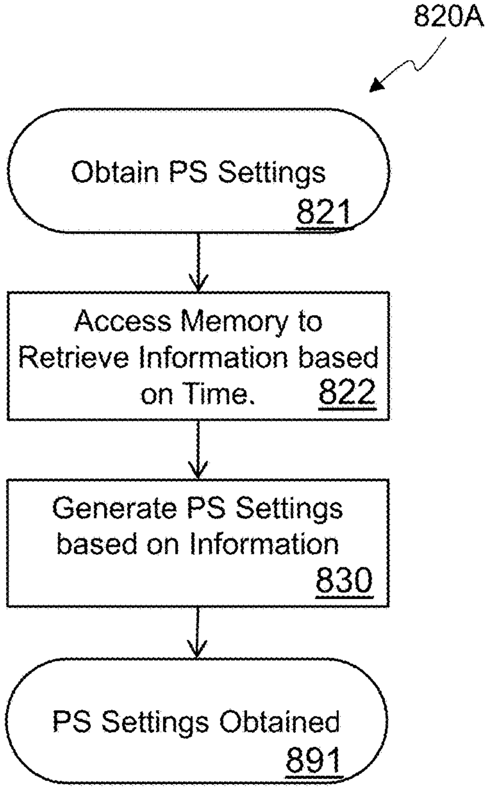

FIG. 8B shows a flow chart 820 providing further details of an embodiment of a method to periodically obtain power supply settings 820 in FIG. 8A. This may constitute a method for controlling a light characteristic of luminaire and may include obtaining power supply settings 821 for two or more power supplies based on a time of day. The power supply settings can be based on target characteristics for a luminaire having a first light emitter powered by a first direct current (DC) power supply of the two or more power supplies and a second light emitter powered by a second DC power supply of the two or more power supplies. Once the power supply settings are obtained, they are then sent to the two or more power supplies independent of an ON/OFF state of the luminaire 890 (from FIG. 8A). In some implementations the target characteristics for the luminaire include a brightness greater than zero and a correlated color temperature (CCT).

The power supply settings may be obtained 821 by accessing a memory 822 to retrieve information based on the time of day and generating 830 a set of power supply settings based on the information. Thus, the power supply settings may be obtained 891 by calculating them based on information retrieved from memory. Alternatively, the power supply settings may be directly stored in the memory, so they may be obtained 891 by simply retrieving them from the memory. The set of power supply settings are then sent as the power supply setting to the two or more power supplies independent of the ON/OFF state of the luminaire. This may be repeated periodically as the time of day changes. In some embodiments, the memory may be accessed based on both a day identifier (e.g. a date or a day of the week) and the time of day.

In some implementations, the information is stored in a table in memory and a period for repeating the retrieving the information from memory, generating the power supply settings from the information, and sending the power supply settings to the power supplies is constant. In at least one embodiment, the table has at least 96 entries the period for repeating the retrieving, generating, and sending is no greater than 15 minutes. As an example, the table may include at least 1440 entries, and the period for repeating the retrieving, generating, and sending is no greater than 1 minute. This allows for very small changes in the lighting characteristic to be used and still generate large differences over time to minimize distracting occupants of the room where the luminaires reside. In some cases, any two consecutive sets of power supply settings have a difference of less than 1% of the maximum value and/or, cause an imperceptible difference in a light output of the luminaire. One example of an imperceptible difference is a difference of less than 50K in a correlated color temperature (CCT) of light from the luminaire.

In some embodiments, the memory may store the target parameters for the luminaire, such as the target CCT and brightness, and use information about the luminaire (which may be stored in a profile for the luminaire as described earlier), to calculate the power supply settings to generate that target CCT and brightness. In other embodiments, the memory stores a table of sets of power supply settings associated with corresponding times of day, so the information stored in memory is the set of power supply settings that have been predetermined to cause the luminaire(s) to generate the target CCT and brightness for the time of day associated with that entry in the table.

The table in memory may be set up by any applicable method, including populating it at manufacturing time or by receiving a table of information associated with corresponding times of day through a communication interface and storing the table in the memory. The table of information may be received from an app running on a mobile electronic device, from a server accessed over the internet, or from any other type of electronic device coupled to the communication interface of the lighting controller. In at least one embodiment, the memory may be a removable memory device, such as a Secure Digital (SD) Card, a USB drive, or some other type of removable memory device accessed through a socket (i.e. a connector). The removable memory device may be populated with the table of information by another electronic device and inserted into the lighting controller. In such systems, the lighting controller may detect whether the information is accessible through a socket for a user-removable memory device and send constant default values for the power supply settings in response to detecting that the information is not accessible through the socket, periodically repeating the check to see if the memory device is inserted and contains the table of information. Once the table is accessible through the socket, the information may be accessed from the table and used to generate power supply settings to send to the power supplies.

In some implementations, the lighting controller may be coupled to multiple sets of power supplies driving multiple sets of luminaires. Different lighting parameters for the different sets of luminaires may be supported by storing multiple tables in the memory that can be used to generate different power supply settings for the different sets of power supplies. In such embodiments, the lighting controller may receive a second table through a communication interface and store the second table in the memory. The second table may then be accessed to retrieve second information based on the time of day which is then used to generate a second set of power supply settings which are then sent to additional power supplies, different than the two or more power supplies, coupled to an additional luminaire, different than the luminaire, independent of an ON/OFF state of the additional luminaire. The second set of power supply settings associated with a particular time of day are based on a target characteristic for the additional luminaire that may be different than the target characteristic for the luminaire at the particular time of day.

Figure 8C:
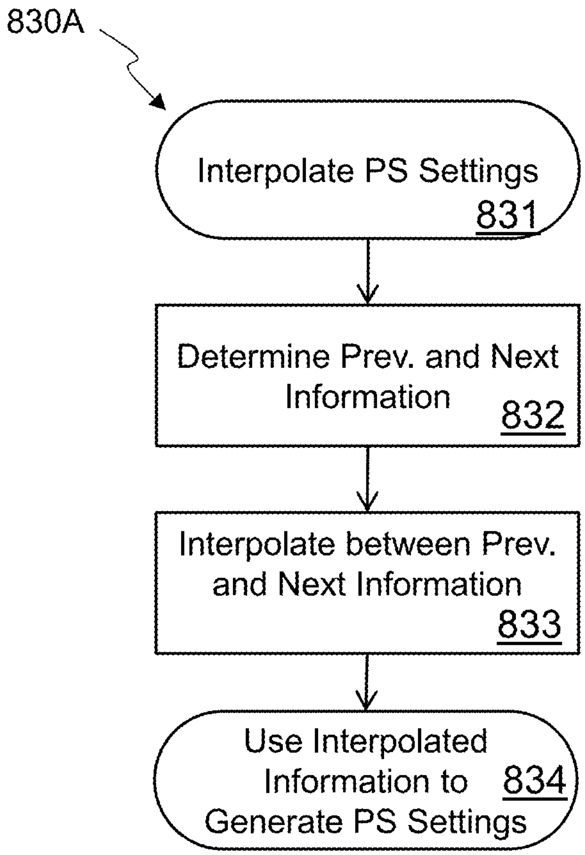

FIG. 8C shows a flow chart 830A of further details of an embodiment of a method to generate power supply settings 830 in FIG. 8B by using interpolation 831 to minimize the step size of changes in the power supply settings, and therefore in the lighting characteristics of the attached luminaires. The flowchart 830A continues by determining 832 previous and next information. The previous information may be the information last accessed from a table stored in memory associated with a previous time of day. The time of day may then be updated to an updated time of day, wherein the information becomes previous information associated with a past time of day earlier than the updated time of day. The memory is then accessed again to retrieve next information associated with a future time of day no earlier than the updated time of day. An interpolated set 833 of power supply settings based on both the previous information and the next information is then calculated and sent to the two or more power supplies independent of the ON/OFF state of the luminaire. In some cases, the information is power supply settings, so the interpolated information is the power supply settings; but, in other cases, the interpolated information may be lighting characteristics which are then used to generate 834 the power supply settings based on a profile of the luminaires or other information about how to convert the stored information into power supply settings. This may be repeated periodically as the time of day changes. In some embodiments the table has 24 or fewer entries and a period for repeating is no greater than 15 minutes and in other cases, the table has 10 or fewer entries and a period for repeating is no greater than 1 minute. The interpolation may result in any two consecutive interpolated power supply settings having a difference of less than 1% of the maximum value and/or cause an imperceptible difference in a light output of the luminaire powered by the two or more power supplies, such as a difference of less than 50K in a correlated color temperature (CCT) of light from the luminaire powered by the two or more power supplies.

Refer back to the lighting controller 160 of FIG. 1C, at least one non-transitory machine-readable medium 165 may include one or more instructions 166 that in response to being executed on a computing device 161 cause the computing device 161 to carry out any of the methods described herein for controlling a light characteristic of a luminaire. So, the controller 160 may include a clock 164 to provide a time of day, a power supply control interface 163 and the at least one non-transitory machine-readable medium 165 storing the one or more instructions 166. It may also include a processor 161, communicatively coupled to the clock 164, the power supply control interface 163, and the at least one non-transitory machine-readable medium 165. The processor 161 may the carry one or more of the methods for controlling the light characteristic of the luminaire.

As will be appreciated by those of ordinary skill in the art, aspects of the various embodiments may be embodied as a system, device, method, computer program product apparatus, or article of manufacture. Accordingly, elements of the present disclosure may take the form of an entirely hardware embodiment, an entirely software embodiment (including firmware, resident software, micro-code, or the like) or an embodiment combining software and hardware aspects that may all generally be referred to herein as a "apparatus," "server," "circuitry," "module," "client," "computer," "logic," "FPGA," "system," or other terms. Furthermore, aspects of the various embodiments may take the form of a computer program product embodied in one or more computer-readable medium(s) having computer program code stored thereon. The phrases "computer program code" and "instructions" both explicitly include configuration information for an FPGA or other programmable logic as well as traditional binary computer instructions, and the term "processor" explicitly includes logic in an FPGA or other programmable logic configured by the configuration information in addition to a traditional processing core. Furthermore, "executed" instructions explicitly includes electronic circuitry of an FPGA or other programmable logic performing the functions for which they are configured by configuration information loaded from a storage medium as well as serial or parallel execution of instructions by a traditional processing core.

Any combination of one or more computer-readable storage medium(s) may be utilized. A computer-readable storage medium may be embodied as, for example, an electronic, magnetic, optical, electromagnetic, infrared, or semiconductor system, apparatus, or device, or other like storage devices known to those of ordinary skill in the art, or any suitable combination of computer-readable storage mediums described herein. In the context of this document, a computer-readable storage medium may be any tangible medium that can contain, or store a program and/or data for use by or in connection with an instruction execution system, apparatus, or device. Even if the data in the computer-readable storage medium requires action to maintain the storage of data, such as in a traditional semiconductor-based dynamic random-access memory, the data storage in a computer-readable storage medium can be considered to be non-transitory. A computer data transmission medium, such as a transmission line, a coaxial cable, a radio-frequency carrier, and the like, may also be able to store data, although any data storage in a data transmission medium can be said to be transitory storage. Nonetheless, a computer-readable storage medium, as the term is used herein, does not include a computer data transmission medium.

Computer program code for carrying out operations for aspects of various embodiments may be written in any combination of one or more programming languages, including object-oriented programming languages such as Java, Python, C++, or the like, conventional procedural programming languages, such as the "C" programming language or similar programming languages, or low-level computer languages, such as assembly language or micro-code. In addition, the computer program code may be written in VHDL or another hardware description language to generate configuration instructions for an FPGA or other programmable logic. The computer program code if converted into an executable form and loaded onto a computer, FPGA, or other programmable apparatus, produces a computer implemented method. The instructions which execute on the computer, FPGA, or other programmable apparatus may provide the mechanism for implementing some or all of the functions/acts specified in the flowchart and/or block diagram block or blocks. In accordance with various implementations, the computer program code may execute entirely on the user's device, partly on the user's device and partly on a remote device, or entirely on the remote device, such as a cloud-based server. In the latter scenario, the remote device may be connected to the user's device through any type of network, including a local area network (LAN) or a wide area network (WAN), or the connection may be made to an external computer (for example, through the Internet using an Internet Service Provider). The computer program code stored in/on (i.e. embodied therewith) the non-transitory computer-readable medium produces an article of manufacture.

The computer program code, if executed by a processor, causes physical changes in the electronic devices of the processor which change the physical flow of electrons through the devices. This alters the connections between devices which changes the functionality of the circuit. For example, if two transistors in a processor are wired to perform a multiplexing operation under control of the computer program code, if a first computer instruction is executed, electrons from a first source flow through the first transistor to a destination, but if a different computer instruction is executed, electrons from the first source are blocked from reaching the destination, but electrons from a second source are allowed to flow through the second transistor to the destination. So, a processor programmed to perform a task is transformed from what the processor was before being programmed to perform that task, much like a physical plumbing system with different valves can be controlled to change the physical flow of a fluid.

Examples of Various Embodiments are Described in the Following Paragraphs:

Example 1. A method for controlling a correlated color temperature (CCT) of one or more luminaires, the method comprising: obtaining a target CCT for the one or more luminaires; obtaining a first profile associated with a first luminaire of the one or more luminaires; calculating a first target power for a first direct-current (DC) power input of the first luminaire and a second target power for a second DC power input of the first luminaire based on the target CCT and the first profile, the first target power and the second target power calculated to drive the first luminaire to emit light at the target CCT; and controlling a first DC power supply to deliver the first target power to the first DC power input of the first luminaire and a second DC power supply to deliver the second target power to the second DC power input of the first luminaire.

Example 2. The method of example 1, wherein the first luminaire has no electrical power inputs other than the first DC power input and the second DC power input.

Example 3. The method of example 1 or 2, further comprising: obtaining a type identifier of the first luminaire; and retrieving the first profile from a database storing a plurality of profiles based on the type identifier of the first luminaire.

Example 4. The method of example 3, wherein the type identifier comprises a model number, a serial number, a manufacturer, information received from the first luminaire over a digital communication link, information from an RFID tag, and/or information from a QR code.

Example 5. The method of example 3 or 4, further comprising receiving the type identifier from a user.

Example 6. The method of any of examples 1-5, further comprising: obtaining a second profile, different than the first profile, for a second luminaire of the one or more luminaires; calculating a third target power for a first direct-current (DC) power input of the second luminaire and a fourth target power for a second DC power input of the second luminaire based on the target CCT and the second profile, the third target power and the fourth target power calculated to drive the second luminaire to emit light at the target CCT; and controlling a third DC power supply to deliver the third target power to the first DC power input of the second luminaire and a fourth DC power supply to deliver the fourth target power to the second DC power input of the second luminaire.

Example 7. The method of any of examples 1-6, further comprising: determining that N other luminaires of the one or more luminaires are also associated with the first profile and that a first DC power input and a second DC power input of the N other luminaires are respectively electrically coupled to the first DC power input and the second DC power input of the first luminaire; controlling the first DC power supply to deliver N+1 times the first target power and the second DC power supply to deliver N+1 times the second target power.

Example 8. The method of example 7, further comprising: determining that the first luminaire and the N other luminaires are serially coupled to the first DC power supply and to the second DC power supply; and setting voltages of the first DC power supply and the second DC power supply based on N.

Example 9. The method of example 7, further comprising: determining that the first luminaire and the N other luminaires are coupled in parallel to the first DC power supply and to the second DC power supply; and setting currents of the first DC power supply and the second DC power supply based on N.

Example 10. The method of any of examples 1-10, further comprising: determining a solar position for a location of the one or more luminaires; and determining the target CCT based on the solar position.

Example 11. The method of any of examples 1-11, further comprising: determining a clock time for a location of the one or more luminaires; and determining the target CCT based on the clock time and the location.

Example 12. The method of any of examples 1-11, further comprising: obtaining a target brightness setting for the one or more luminaires; and calculating the first target power and the second target power further based on the target brightness setting and the first profile, the first target power and the second target power calculated to drive the first luminaire to emit light at the target brightness with the target CCT.

Example 13. The method of any of examples 1-12, further comprising: receiving a user control for the first luminaire from a user input device; and calculating the first target power and the second target power further based on the user control.

Example 14. The method of example 13, wherein the user control comprises a brightness setting, an on/off control, or the target CCT; and the user input device comprises a wall switch, a wireless remote control, or a mobile electronic device with a graphical user interface.

Example 15. At least one non-transitory machine-readable medium comprising one or more instructions that in response to being executed on a computing device cause the computing device to carry out a method according to any one of examples 1 to 14.

Example 16. A lighting controller comprising a power supply control interface configured to communicate with two or more power supplies; a processor coupled to the power supply control interface; and one or more memory devices coupled to the processor and storing instructions to program the processor to perform a method according to any one of examples 1 to 14.

Example 17. A direct current tunable lighting control system, comprising: two or more direct current (DC) tunable light fixtures configured to emit light, each of the two or more DC tunable light fixtures comprising: one or more orange LED configured to emit an amount of orange light output, wherein the amount of orange light output correlates with a first amount of power provided to the one or more orange LED, such that an increase in the first amount of power results in an increase in the amount of orange light output and a decrease in the first amount of power results in a decrease in the amount of orange light output; and one or more blue LED, configured to emit an amount of blue light output, wherein the amount of blue light output correlates with a second amount of power provided to the one or more blue LED, such that an increase in the second amount of power results in an increase in the amount of blue light output and a decrease in the second amount of power results in a decrease in the amount of blue light output; one or more direct current (DC) power regulator separate from, but electrically connected to, the two or more DC tunable light fixtures, wherein the DC power regulator is configured to conduct the first amount of power on a first channel to the one or more orange LED of each of the two or more DC tunable light fixtures and to conduct the second amount of power on a second channel to the one or more blue LED of each of the two or more DC tunable light fixtures; and a bridge controller, separate from the two or more DC tunable light fixtures, comprising one or more computer processor configured to execute instructions that cause the one or more computer processor to: receive one or more of a geographical location and a time zone; receive information indicative of times of predetermined solar events for one or more day at the geographical location or in the time zone, wherein the predetermined solar events comprise sunrise, solar noon, and sunset, wherein each of the predetermined solar events has an assigned solar color temperature in a predetermined range; and transmit one or more signal to the DC power regulator at the times of the predetermined solar events, the signal indicative of instructions for the one or more DC power regulator to change at least one of the first amount of power and the second amount of power, such that the light emitted by the two or more DC tunable light fixtures at the times of the predetermined solar events has a fixture color temperature that is in the predetermined range of the assigned solar color temperature of a corresponding predetermined solar event.

Example 18. A direct current tunable lighting control system, comprising: two or more direct current (DC) tunable light fixture configured to emit light, each of the two or more DC tunable light fixtures comprising: one or more orange LED configured to emit an amount of orange light output, wherein the amount of orange light output correlates with a first amount of power provided to the one or more orange LED, such that an increase in the first amount of power results in an increase in the amount of orange light output and a decrease in the first amount of power results in a decrease in the amount of orange light output; and one or more blue LED, configured to emit an amount of blue light output, wherein the amount of blue light output correlates with a second amount of power provided to the one or more blue LED, such that an increase in the second amount of power results in an increase in the amount of blue light output and a decrease in the second amount of power results in a decrease in the amount of blue light output; one or more direct current (DC) power regulator separate from, but electrically connected to, the two or more DC tunable light fixtures, wherein the DC power regulator is configured to conduct the first amount of power on a first channel to the one or more orange LED of each of the two or more DC tunable light fixtures and to conduct the second amount of power on a second channel to the one or more blue LED of each of the two or more DC tunable light fixtures; and a virtual bridge controller, separate from the two or more DC tunable light fixtures, comprising executable instructions, that when executed by one or more computer processor, cause the one or more computer processor to: receive a geographical location or a time zone; receive information indicative of times of predetermined solar events for one or more day at the geographical location or in the time zone, wherein the predetermined solar events comprise sunrise, solar noon, and sunset, wherein each of the predetermined solar events has an assigned solar color temperature in a predetermined range; and transmit one or more signal at the times of the predetermined solar events to the one or more DC power regulator, the signal indicative of instructions to the one or more DC power regulator to change at least one of the first amount of power and the second amount of power, such that the light emitted by the two or more DC tunable light fixtures at the times of the predetermined solar events has a fixture color temperature that is in the predetermined range of the assigned solar color temperature of a corresponding predetermined solar event.

Example 19. A direct current tunable lighting control system, comprising: two or more direct current (DC) tunable light fixture configured to emit light, each comprising: one or more first LED configured to emit an amount of first light output having a first mired value, wherein the amount of first light output correlates with a first amount of power provided to the one or more first LED, such that an increase in the first amount of power results in an increase in the amount of first light output and a decrease in the first amount of power results in a decrease in the amount of first light output; and one or more second LED, configured to emit an amount of second light output, wherein the amount of second light output correlates with a second amount of power provided to the one or more second LED, such that an increase in the second amount of power results in an increase in the amount of second light output and a decrease in the second amount of power results in a decrease in the amount of second light output; one or more direct current (DC) power regulator separate from, but electrically connected to, each of the two or more DC tunable light fixture, wherein the DC power regulator is configured to conduct the first amount of power on a first channel to the one or more first LED and to conduct the second amount of power on a second channel to the one or more second LED; and a bridge controller, separate from the two or more DC tunable light fixtures, comprising one or more computer processor configured to execute instructions that cause the one or more computer processor to: receive a geographical location or a time zone; receive information indicative of times of predetermined solar events for one or more day at the geographical location or in the time zone, wherein the predetermined solar events comprise sunrise, solar noon, and sunset, wherein each of the predetermined solar events has an assigned solar color temperature in a predetermined range; and transmit one or more signal at the times of the predetermined solar events to the DC power regulator, the signal indicative of instructions for the DC power regulator to change at least one of the first amount of power and the second amount of power, such that the light emitted by the two or more DC tunable light fixtures at the times of the predetermined solar events has a fixture color temperature that is in the predetermined range of the assigned solar color temperature of a corresponding predetermined solar event.

Example 20. A method comprising the steps of: receiving, with a bridge controller, information indicative of times of predetermined solar events for one or more day at a geographical location or in a time zone, wherein the predetermined solar events comprise sunrise, solar noon, and sunset, wherein each of the predetermined solar events has an assigned solar color temperature in a predetermined range; and transmitting, at the times of the predetermined solar events with the bridge controller, one or more signal to a DC power regulator connected to two or more direct current (DC) tunable light fixtures, each comprising one or more orange LED and one or more blue LED, one or more signal indicative of instructions to change at least one of a first amount of power transmitted to the one or more orange LED and a second amount of power transmitted to the blue LED, such that light emitted by the two or more DC tunable light fixtures at the times of the predetermined solar events has a fixture color temperature that is in the predetermined range of the assigned solar color temperature of a corresponding predetermined solar event, wherein the bridge controller and the DC power regulator are separate from the two or more DC tunable light fixtures.

Example 21. The example of claim 20, wherein the bridge controller is a virtual bridge controller.

Example 22. A lighting system comprising: at least one luminaire each comprising a first LED having a first spectral characteristic driven by a first direct-current (DC) power input and a second LED having a second spectral characteristic driven by a second DC power input; a first DC power supply, separate from the at least one luminaire, having a first DC power output; a second DC power supply, separate from the at least one luminaire, having a second DC power output; a switch, coupled to the first DC power input and the second DC power input of the at least one luminaire, the first DC power output of the first DC power supply, and the second DC power output of the second DC power supply, the switch having: an ON state where power from the first DC power output of the first DC power supply flows through the switch to the first DC power input of the at least one luminaire, and power from the second DC power output of the second DC power supply flows through the switch to the second DC power input of the at least one luminaire; and an OFF state where no power flows into the at least one luminaire from the first DC power supply or the second DC power supply; and a lighting controller communicatively coupled to the first DC power supply and the second DC power supply and including a clock to provide a time of day, the lighting controller configured to: (a) determine a first setting for the first DC power supply and a second setting for the second DC power supply based on the time of day and a target characteristic for the at least one luminaire at the time of day; (b) send the first setting to the first DC power supply and the second setting to the second DC power supply at the time of day independent of the ON/OFF state of the switch; and periodically repeat (a) and (b) as the time of day changes.

Example 23. The lighting system of example 22, wherein the first DC power supply and the lighting controller are integrated into a single unit.

Example 24. The lighting system of example 22, wherein the first DC power supply and the second DC power supply are integrated into a single multi-output power supply.

Example 25. The lighting system of example 22, the switch comprising a double-pole configuration with a first pole switching a connection of the first DC power supply and a second pole switching a connection of the second DC power supply.

Example 26. The lighting system of example 22, the switch comprising a single-pole configuration with switching a connection shared by the first DC power supply and the second DC power supply.

Example 27. The lighting system of example 22, further comprising: a network interface in the lighting controller, the lighting controller further configured to receive information useable to determine the first setting for the first DC power supply and the second setting for the second DC power supply based on the time of day; and a system controller, the system controller comprising a processor, a user interface and a network interface both coupled to the processor, and a memory storing instructions that if executed by the processor, cause the system controller to: receive an input through the user interface; use the input to select the target characteristic for the at least one luminaire at the time of day; use the target characteristic to generate the information useable to determine the first setting for the first DC power supply and the second setting for the second DC power supply; and send the information to the lighting controller through the network interface of the system controller and the network interface of the lighting controller.

Example 28. A controller comprising: a clock to provide a time of day; a settings calculator, coupled to the clock, to determine power supply settings for two or more power supplies based on the time of day, wherein the power supply settings are based on a target characteristic for a luminaire having a first light emitter powered by a first direct current (DC) power supply of the two or more power supplies and a second light emitter powered by a second DC power supply of the two or more power supplies; a power supply control interface configured to send the power supply settings to the two or more power supplies independent of an ON/OFF state of the luminaire.

Example 29. The controller of example 28, wherein the target characteristic for the luminaire include a brightness greater than zero and a correlated color temperature (CCT).

Example 30. The controller of example 28, the clock comprising a real-time clock with battery backup.

Example 31. The controller of example 30, further comprising a user input device to provide a time zone for the real-time clock.

Example 32. The controller of example 31, the user input device including an input for the settings calculator to use constant default values for the power supply settings.

Example 33. The controller of example 28, the settings calculator comprising: a memory device; and circuitry to retrieve information from the memory device based on the time of day and generate a set of power supply settings based on the information; wherein the power supply settings for the two or more power supplies sent by the power supply control interface include the set of power supply settings.

Example 34. The controller of example 33, wherein the memory device is user replaceable.

Example 35. The controller of example 33, wherein the memory device stores a table of sets of power supply settings associated with corresponding times of day, and the information comprises the set of power supply settings associated with the time of day.

Example 36. The controller of example 33, wherein the memory device stores a table of information associated with corresponding times of day, and the table has at least one entry for each minute in a day.

Example 37. The controller of example 33, wherein the circuitry of the settings calculator is configured to periodically retrieve updated information from the memory device based on the time of day and generate an updated set of power supply settings based on the updated information as the time of day changes; and the power supply control interface is configured to periodically send the updated set of power supply settings to the two or more power supplies independent of the ON/OFF state of the luminaire Example 38. The controller of example 37, wherein the information is stored in a table that has at least 96 entries, and a period for repeating said retrieving, generating, and sending is no greater than 15 minutes.

Example 39. The controller of example 37, wherein the information is stored in a table that has at least 1440 entries, and a period for repeating said retrieving, generating, and sending is no greater than 1 minute.

Example 40. The controller of example 37, wherein any two consecutive updated sets of power supply settings have a difference of less than 1% of a maximum value of a power supply setting.

Example 41. The controller of example 37, wherein any two consecutive updated sets of power supply settings cause an imperceptible difference in a light output of the luminaire powered by the two or more power supplies.

Example 42. The controller of example 37, wherein any two consecutive updated sets of power supply settings in the table cause a difference of less than 50K in a correlated color temperature (CCT) of light from the luminaire powered by the two or more power supplies.

Example 43. The controller of example 33, further comprising a network interface; the settings calculator further configured to receive a second table through the network interface, store the second table in the memory device in addition to a first table holding the information stored therein, retrieve second information from the second table based on the time of day, and generate a second set of power supply settings based on the second information; the power supply control interface further configured to send the second set of power supply settings to additional power supplies, different than the two or more power supplies, coupled to an additional luminaire, different than the luminaire, independent of an ON/OFF state of the additional luminaire; wherein the second set of power supply settings associated with a particular time of day are based on a target characteristic for the additional luminaire that is different than the target characteristic for the luminaire at the particular time of day.

Example 44. The controller of example 28, the settings calculator comprising: a memory device storing a table of information associated with corresponding times of day; circuitry to retrieve first information associated with a time earlier than the time of day and second information associated with a time no earlier than the time of day from the table of information; an interpolator to calculate an interpolated set of power supply settings based on both the first information and the second information; wherein the power supply settings for the two or more power supplies sent by the power supply control interface include the interpolated set of power supply settings.

Example 45. The controller of example 44, the table of information having 24 or fewer entries and the settings calculator configured to recalculate the interpolated set of power supply settings at least every 15 minutes.

Example 46. The controller of example 44, the table of information having 10 or fewer entries and the settings calculator configured to recalculate the interpolated set of power supply settings at least every minute.

Example 47. The controller of example 44, the settings calculator configured to recalculate the interpolated set of power supply settings periodically, wherein any two consecutive interpolated power supply settings have a difference of less than 1% of a maximum value of a power supply setting.

Example 48. The controller of example 44, the settings calculator configured to recalculate the interpolated set of power supply settings periodically, wherein any two consecutive interpolated power supply settings cause an imperceptible difference in a light output of the luminaire powered by the two or more power supplies.

Example 49. The controller of example 44, the settings calculator configured to recalculate the interpolated set of power supply settings periodically, wherein any two consecutive interpolated power supply settings cause a difference of less than 50K in a correlated color temperature (CCT) of light from the luminaire powered by the two or more power supplies.

Example 50. The controller of example 28, the power supply control interface configured to periodically send a current set of power supply settings, the current set of power supply settings redetermined by the settings calculator as the time of day changes.

Example 51. The controller of example 50, the power supply control interface configured to use a protocol compliant with Digital Multiplex (DMX) standards to communicate with the two or more power supplies.

Example 52. The controller of example 28, further comprising the first power DC power supply and the second DC power supply.

Example 53. The controller of example 28, further comprising a network interface: the clock configured to set the time of day by communicating over the network interface.

Example 54. The controller of example 53, the settings calculator configured to use constant default values for the power supply settings until the clock has set the time of day.

Example 55. The controller of example 28, further comprising a memory device and a network interface; the settings calculator configured to: receive a table through the network interface; store the table in the memory device; and retrieve information from the table stored in the memory device based on the time of day; and generate a set of power supply settings based on the information; wherein the power supply settings for the two or more power supplies sent by the power supply control interface include the set of power supply settings.

Example 56. The controller of example 55, wherein the table is sent to the controller by an app running on a mobile electronic device.

Example 57. The controller of example 28, further comprising a socket for a user-replaceable memory device; the settings calculator configured to use constant default values for the power supply settings upon determining that no information to determine the power supply settings can be retrieved through the socket.

Example 58. A method for controlling a light characteristic of a luminaire, the method comprising: obtaining power supply settings for two or more power supplies based on a time of day, wherein the power supply settings are based on a target characteristic for a luminaire having a first light emitter powered by a first direct current (DC) power supply of the two or more power supplies and a second light emitter powered by a second DC power supply of the two or more power supplies; sending the power supply settings to the two or more power supplies independent of an ON/OFF state of the luminaire.

Example 59. The method of example 58, wherein the target characteristic for the luminaire include a brightness greater than zero and a correlated color temperature (CCT).

Example 60. The method of example 58, further comprising using constant default values for the power supply settings until an input to set a local time is received.

Example 61. The method of example 58, further comprising: (a) accessing a memory to retrieve information based on the time of day; (b) generating a set of power supply settings based on the information, wherein the power supply settings include the set of power supply settings; and (c) sending the set of power supply settings to the two or more power supplies independent of the ON/OFF state of the luminaire.

Example 62. The method of example 61, further comprising periodically repeating (a), (b), and (c) as the time of day changes.

Example 63. The method of example 62, wherein the memory is accessed based on both a day identifier and the time of day.

Example 64. The method of example 62, wherein the information is stored in a table that has at least 96 entries, and a period for repeating (a), (b), and (c) is constant and no greater than 15 minutes.

Example 65. The method of example 62, wherein the information is stored in a table that has at least 1440 entries, and a period for repeating (a), (b), and (c) is no greater than 1 minute.

Example 66. The method of example 62, wherein the memory stores a table of sets of power supply settings associated with corresponding times of day, and the information comprises the set of power supply settings associated with the time of day.

Example 67. The method of example 62, further comprising: receiving a table of information associated with corresponding times of day through a communication interface; and storing the table in the memory.

Example 68. The method of example 67, wherein the table of information is received from an app running on a mobile electronic device.

Example 69. The method of example 62, further comprising: detecting whether the information is accessible through a socket for a user-removable memory device; sending constant default values for the power supply settings in response to detecting that the information is not accessible through the socket; and periodically repeating (a), (b), and (c) in response to detecting that the information is accessible through the socket.

Example 70. The method of example 62, wherein any two consecutive sets of power supply settings have a difference of less than 1% of a maximum value of a power supply setting.

Example 71. The method of example 62, wherein any two consecutive sets of power supply settings in the table cause an imperceptible difference in a light output of the luminaire.

Example 72. The method of example 62, wherein any two consecutive sets of power supply settings in the table cause a difference of less than 50K in a correlated color temperature (CCT) of light from the luminaire.

Example 73. The method of example 62, wherein the information is stored in a first table, the method further comprising: receiving a second table through a communication interface; storing the second table in the memory; accessing the second table to retrieve second information based on the time of day; generating a second set of power supply settings based on the second information; and sending the second set of power supply settings to additional power supplies, different than the two or more power supplies, coupled to an additional luminaire, different than the luminaire, independent of an ON/OFF state of the additional luminaire; wherein the second set of power supply settings associated with a particular time of day are based on a target characteristic for the additional luminaire that is different than the target characteristic for the luminaire at the particular time of day.

Example 74. The method of example 58, further comprising: accessing a table stored in a memory to retrieve next information associated with the time of day (a) updating the time of day to an updated time of day, wherein the next information becomes previous information associated with a past time of day earlier than the updated time of day; (b) accessing the memory to retrieve next information associated with a future time of day no earlier than the updated time of day; (c) calculating an interpolated set of power supply settings based on both the previous information and the next information, wherein the power supply settings include the interpolated set of power supply settings; (d) sending the interpolated set of power supply settings to the two or more power supplies independent of the ON/OFF state of the luminaire; and periodically repeating (a) through (d).

Example 75. The method of example 74, wherein the table has 24 or fewer entries and a period for repeating (a) through (d) is no greater than 15 minutes.

Example 76. The method of example 74, wherein the table has 10 or fewer entries and a period for repeating (a) through (d) is no greater than 1 minute.

Example 77. The method of example 74, wherein any two consecutive interpolated power supply settings have a difference of less than 1% of a maximum value of a power supply setting.

Example 78. The method of example 74, wherein any two consecutive interpolated power supply settings cause an imperceptible difference in a light output of the luminaire powered by the two or more power supplies.

Example 79. The method of example 74, wherein any two consecutive interpolated power supply settings cause a difference of less than 50K in a correlated color temperature (CCT) of light from the luminaire powered by the two or more power supplies.

Example 80. The method of example 58, further comprising periodically obtaining a current set of power supply settings and sending the current set of power supply settings to the two or more power supplies, wherein the power supply settings include the current set of power supply settings.

Example 81. The method of example 80, further comprising using a protocol compliant with Digital Multiplex (DMX) standards to communicate with the two or more power supplies.

Example 82. The method of example 58, further comprising communicating over a network interface to receive information to set the time of day.

Example 83. The method of example 82, using constant default values for the power supply settings until the time of day has been set.

Example 84. At least one non-transitory machine-readable medium comprising one or more instructions that in response to being executed on a computing device cause the computing device to carry out a method for controlling a light characteristic of a luminaire, the method being any of the methods of examples 58 through example 62.

Example 85. A controller comprising: a clock to provide a time of day; a power supply control interface; the at least one non-transitory machine-readable medium of example 84; a processor, communicatively coupled to the clock, the power supply control interface, and the at least one non-transitory machine-readable medium, wherein the processor comprises the computing device to carry out the method for controlling the light characteristic of the luminaire.

Unless otherwise indicated, all numbers expressing quantities, properties, measurements, and so forth, used in the specification and claims are to be understood as being modified in all instances by the term "about." The recitation of numerical ranges by endpoints includes all numbers subsumed within that range, including the endpoints (e.g. 1 to 5 includes 1, 2.78, $\pi$, $3.\overline{33}$, 4, and 5).

As used in this specification and the appended claims, the singular forms "a", "an", and "the" include plural referents unless the content clearly dictates otherwise. Furthermore, as used in this specification and the appended claims, the term "or" is generally employed in its sense including "and/or" unless the content clearly dictates otherwise. As used herein, the term "coupled" includes direct and indirect connections. Moreover, where first and second devices are coupled, intervening devices including active devices may be located there between. Furthermore, "based on" is intended to mean "based, at least in part, on" unless explicitly stated otherwise.

The use of ordinal number terminology (i.e., "first", "second", "third", "fourth", etc.) is solely for the purpose of differentiating between two or more items and, unless explicitly stated otherwise, is not meant to imply any sequence or order or importance to one item over another or any order of addition. As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

The description of the various embodiments provided above is illustrative in nature and is not intended to limit this disclosure, its application, or uses. Thus, different variations beyond those described herein are intended to be within the scope of embodiments. Such variations are not to be regarded as a departure from the intended scope of this disclosure. As such, the breadth and scope of the present disclosure should not be limited by the above-described exemplary embodiments but should be defined only in accordance with the following claims and equivalents thereof.

What is claimed is:

1. A lighting system comprising:

at least one luminaire each comprising a first LED having a first spectral characteristic driven by a first direct-current (DC) power input and a second LED having a second spectral characteristic driven by a second DC power input;

a first DC power supply, separate from the at least one luminaire, having a first DC power output;

a second DC power supply, separate from the at least one luminaire, having a second DC power output;

a switch, coupled to the first DC power input and the second DC power input of the at least one luminaire, the first DC power output of the first DC power supply, and the second DC power output of the second DC power supply, the switch having:

an ON state where power from the first DC power output of the first DC power supply flows through the switch to the first DC power input of the at least one luminaire, and power from the second DC power output of the second DC power supply flows through the switch to the second DC power input of the at least one luminaire; and an OFF state where no power flows into the at least one luminaire from the first DC power supply or the second DC power supply; and a lighting controller communicatively coupled to the first DC power supply and the second DC power supply and including a clock to provide a time of day, the lighting controller configured to:

(a) determine a first setting for the first DC power supply and a second setting for the second DC power supply based on the time of day and a target characteristic for the at least one luminaire at the time of day;

(b) send the first setting to the first DC power supply and the second setting to the second DC power supply at the time of day independent of the ON/OFF state of the switch; and periodically repeat (a) and (b) as the time of day changes.

2. The lighting system of claim 1, wherein the first DC power supply and the lighting controller are integrated into a single unit.

3. The lighting system of claim 1, wherein the first DC power supply and the second DC power supply are integrated into a single multi-output power supply.

4. The lighting system of claim 1, the switch comprising a double-pole configuration with a first pole switching a connection of the first DC power supply and a second pole switching a connection of the second DC power supply.

5. The lighting system of claim 1, the switch comprising a single-pole configuration with switching a connection shared by the first DC power supply and the second DC power supply.

6. The lighting system of claim 1, further comprising:

a network interface in the lighting controller, the lighting controller further configured to receive information useable to determine the first setting for the first DC power supply and the second setting for the second DC power supply based on the time of day; and a system controller, the system controller comprising a processor, a user interface, and a network interface both coupled to the processor, and a memory storing instructions that if executed by the processor, cause the system controller to:

receive an input through the user interface;

use the input to select the target characteristic for the at least one luminaire at the time of day;

use the target characteristic to generate the information useable to determine the first setting for the first DC power supply and the second setting for the second DC power supply; and send the information to the lighting controller through the network interface of the system controller and the network interface of the lighting controller.

7. A controller comprising:

a clock to provide a time of day;

a settings calculator, coupled to the clock, to determine power supply settings for two or more power supplies based on the time of day, wherein the power supply settings are based on a target characteristic for a luminaire having a first light emitter powered by a first direct current (DC) power supply of the two or more power supplies and a second light emitter powered by a second DC power supply of the two or more power supplies; and a power supply control interface configured to send the power supply settings to the two or more power supplies independent of an ON/OFF state of the luminaire.

8. The controller of claim 7, wherein the target characteristic for the luminaire includes a brightness greater than zero and a correlated color temperature (CCT).

9. The controller of claim 7, the clock comprising a real-time clock with battery backup.

10. The controller of claim 9, further comprising a user input device to provide a time zone for the real-time clock.

11. The controller of claim 7, the settings calculator comprising:

a memory device; and circuitry to retrieve information from the memory device based on the time of day and generate a set of power supply settings based on the information;

wherein the power supply settings for the two or more power supplies sent by the power supply control interface include the set of power supply settings.

12. The controller of claim 11, wherein the memory device is user replaceable.

13. The controller of claim 11, wherein the memory device stores a table of sets of power supply settings associated with corresponding times of day, and the information comprises the set of power supply settings associated with the time of day.

14. The controller of claim 11, wherein the memory device stores a table of information associated with corresponding times of day, and the table has at least one entry for each minute in a day.

15. The controller of claim 11, wherein the circuitry of the settings calculator is configured to periodically retrieve updated information from the memory device based on the time of day and generate an updated set of power supply settings based on the updated information as the time of day changes; and the power supply control interface is configured to periodically send the updated set of power supply settings to the two or more power supplies independent of the ON/OFF state of the luminaire.

16. The controller of claim 11, further comprising a network interface;

the settings calculator further configured to receive a second table through the network interface, store the second table in the memory device in addition to a first table holding the information stored therein, retrieve second information from the second table based on the time of day, and generate a second set of power supply settings based on the second information;

the power supply control interface further configured to send the second set of power supply settings to additional power supplies, different than the two or more power supplies, coupled to an additional luminaire, different than the luminaire, independent of an ON/OFF state of the additional luminaire;

wherein the second set of power supply settings associated with a particular time of day are based on a target characteristic for the additional luminaire that is different than the target characteristic for the luminaire at the particular time of day.

17. The controller of claim 7, the settings calculator comprising:

a memory device storing a table of information associated with corresponding times of day;

circuitry to retrieve first information associated with a time earlier than the time of day and second information associated with a time no earlier than the time of day from the table of information; and an interpolator to calculate an interpolated set of power supply settings based on both the first information and the second information;

wherein the power supply settings for the two or more power supplies sent by the power supply control interface include the interpolated set of power supply settings.

18. The controller of claim 7, the power supply control interface configured to periodically send a current set of power supply settings, the current set of power supply settings redetermined by the settings calculator as the time of day changes.

19. The controller of claim 18, the power supply control interface configured to use a protocol compliant with Digital Multiplex (DMX) standards to communicate with the two or more power supplies.

20. The controller of claim 7, further comprising a network interface:

the clock configured to set the time of day by communicating over the network interface.

21. The controller of claim 7, further comprising a memory device and a network interface;

the settings calculator configured to:

receive a table through the network interface;

store the table in the memory device;

retrieve information from the table stored in the memory device based on the time of day; and generate a set of power supply settings based on the information;

wherein the power supply settings for the two or more power supplies sent by the power supply control interface include the set of power supply settings.

22. The controller of claim 21, wherein the table is sent to the controller by an app running on a mobile electronic device.

23. The controller of claim 7, further comprising a socket for a user-replaceable memory device;

the settings calculator configured to use constant default values for the power supply settings upon determining that no information to determine the power supply settings can be retrieved through the socket.

24. A method for controlling a light characteristic of a luminaire, the method comprising:

obtaining power supply settings for two or more power supplies based on a time of day, wherein the power supply settings are based on a target characteristic for a luminaire having a first light emitter powered by a first direct current (DC) power supply of the two or more power supplies and a second light emitter powered by a second DC power supply of the two or more power supplies; and sending the power supply settings to the two or more power supplies independent of an ON/OFF state of the luminaire.

25. The method of claim 24, wherein the target characteristic for the luminaire includes a brightness greater than zero and a correlated color temperature (CCT).

26. The method of claim 24, further comprising:

(a) accessing a memory to retrieve information based on the time of day;

(b) generating a set of power supply settings based on the information, wherein the power supply settings include the set of power supply settings; and (c) sending the set of power supply settings to the two or more power supplies independent of the ON/OFF state of the luminaire.

27. The method of claim 26, further comprising periodically repeating (a), (b), and (c) as the time of day changes.

28. The method of claim 27, wherein the memory is accessed based on both a day identifier and the time of day.

29. The method of claim 27, wherein the memory stores a table of sets of power supply settings associated with corresponding times of day, and the information comprises the set of power supply settings associated with the time of day.

30. The method of claim 27, further comprising:

receiving a table of information associated with corresponding times of day through a communication interface; and storing the table in the memory.

31. The method of claim 30, wherein the table of information is received from an app running on a mobile electronic device.

32. The method of claim 27, wherein the information is stored in a first table, the method further comprising:

receiving a second table through a communication interface;

storing the second table in the memory;

accessing the second table to retrieve second information based on the time of day;

generating a second set of power supply settings based on the second information; and sending the second set of power supply settings to additional power supplies, different than the two or more power supplies, coupled to an additional luminaire, different than the luminaire, independent of an ON/OFF state of the additional luminaire;

wherein the second set of power supply settings associated with a particular time of day are based on a target characteristic for the additional luminaire that is different than the target characteristic for the luminaire at the particular time of day.

33. The method of claim 24, further comprising:

accessing a table stored in a memory to retrieve next information associated with the time of day;

(a) updating the time of day to an updated time of day, wherein the next information becomes previous information associated with a past time of day earlier than the updated time of day;

(b) accessing the memory to retrieve next information associated with a future time of day no earlier than the updated time of day;

(c) calculating an interpolated set of power supply settings based on both the previous information and the next information, wherein the power supply settings include the interpolated set of power supply settings;

(d) sending the interpolated set of power supply settings to the two or more power supplies independent of the ON/OFF state of the luminaire; and periodically repeating (a) through (d).

34. The method of claim 24, further comprising periodically obtaining a current set of power supply settings and sending the current set of power supply settings to the two or more power supplies, wherein the power supply settings include the current set of power supply settings.

35. The method of claim 34, further comprising using a protocol compliant with Digital Multiplex (DMX) standards to communicate with the two or more power supplies.

36. The method of claim 24, further comprising communicating over a network interface to receive information to set the time of day.

* * * * *